("(12) United States Patent" header)

United States Patent
Wang et al.

(10) Patent No.: US 12,238,596 B2
(45) Date of Patent: Feb. 25, 2025

(54) MEASUREMENT CONFIGURATION METHOD AND APPARATUS

(71) Applicant: Huawei Technologies Co., Ltd., Shenzhen (CN)

(72) Inventors: Zhou Wang, Shenzhen (CN); Jian Wang, Beijing (CN); Le Jin, Shanghai (CN); Haiyi Liu, Shenzhen (CN); Haibo Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 435 days.

(21) Appl. No.: 17/775,378

(22) PCT Filed: Nov. 6, 2020

(86) PCT No.: PCT/CN2020/127106
§ 371 (c)(1),
(2) Date: May 9, 2022

(87) PCT Pub. No.: WO2021/088985
PCT Pub. Date: May 14, 2021

(65) Prior Publication Data
US 2022/0394575 A1 Dec. 8, 2022

(30) Foreign Application Priority Data
Nov. 8, 2019 (CN) .......................... 201911089857.4

(51) Int. Cl.
*H04W 36/00* (2009.01)
*H04W 72/044* (2023.01)
*H04W 36/30* (2009.01)

(52) U.S. Cl.
CPC ..... *H04W 36/0085* (2018.08); *H04W 72/044* (2013.01); *H04W 36/302* (2023.05)

(58) Field of Classification Search
CPC .......... H04W 36/0085; H04W 36/302; H04W 36/0088; H04W 72/044; H04W 48/12; H04W 24/10; H04W 76/27
See application file for complete search history.

(56) References Cited

U.S. PATENT DOCUMENTS

2019/0239106 A1    8/2019  Cui et al.
2019/0254110 A1*   8/2019  He ...................... H04L 41/0896
(Continued)

FOREIGN PATENT DOCUMENTS

CN    109729559 A    5/2019
CN    109788492 A    5/2019
(Continued)

OTHER PUBLICATIONS

3GPP TS 38.321 V15.7.0, Sep. 2019, "3rd Generation Partnership Project; Technical Specification Group Radio Access Network; NR; Medium Access Control (MAC) protocol specification (Release 15)," 78 pages.
(Continued)

*Primary Examiner* — Chi H Pham
*Assistant Examiner* — Vladislav Y Agureyev
(74) *Attorney, Agent, or Firm* — Conley Rose, P.C.

(57) ABSTRACT

A measurement configuration method includes a network device that determines when a bandwidth part (BWP) occupied by a terminal device is switched from a first BWP to a second BWP. The network device sends first information to the terminal device, indicating whether configuration information of a first measurement window takes effect when the terminal device occupies the second BWP and indicating whether the first measurement window is configured for the first BWP.

20 Claims, 12 Drawing Sheets

(56) References Cited

U.S. PATENT DOCUMENTS

| | | | | |
|---|---|---|---|---|
| 2019/0273637 A1* | 9/2019 | Zhang | ................... | H04B 5/72 |
| 2019/0306734 A1* | 10/2019 | Huang | ................ | H04W 24/08 |
| 2019/0313410 A1 | 10/2019 | Yang et al. | | |
| 2019/0363809 A1 | 11/2019 | Yoon et al. | | |
| 2019/0394666 A1* | 12/2019 | Li | ..................... | H04B 7/0417 |
| 2020/0275485 A1* | 8/2020 | Babaei | .............. | H04W 74/006 |
| 2020/0288337 A1* | 9/2020 | Callender | ............ | H04W 24/10 |
| 2020/0296612 A1 | 9/2020 | Ma et al. | | |
| 2020/0374725 A1* | 11/2020 | Chen | .................. | H04L 5/0053 |
| 2021/0076230 A1 | 3/2021 | Chen | | |
| 2021/0306893 A1* | 9/2021 | Zhang | ................ | H04W 24/08 |

FOREIGN PATENT DOCUMENTS

| | | | | |
|---|---|---|---|---|
| CN | 109788497 A | 5/2019 | | |
| CN | 109803304 A | 5/2019 | | |
| CN | 110012498 A | 7/2019 | | |
| CN | 110312267 A | 10/2019 | | |
| CN | 110392991 A | 10/2019 | | |
| WO | 2019068926 A1 | 4/2019 | | |
| WO | WO-2020015563 A1 * | 1/2020 | ......... | H04L 41/0803 |
| WO | WO-2020032716 A1 * | 2/2020 | ............ | H04W 24/02 |

OTHER PUBLICATIONS

Ericsson, "Configuration of measurement gap in NR," Tdoc R2-1713737, update of R2-1709294, 3GPP TSG-RAN WG2 #100, Reno, USA, Nov. 27-Dec. 1, 2017, 3 pages.

NEC, "RLM/RRM measurements after BWP switching," R2-1801139 (revision of R2-1713729), 3GPP TSG-RAN WG2 NR Ad hoc 1801, Vancouver, Canada, Jan. 22-26, 2018, 4 pages.

Huawei et al, "Discussion on Measurement requirements during BWP switching," R4-1815144, 3GPP TSG-RAN WG4 Meeting #89, Spokane, US, Nov. 12-16, 2018, 3 pages, XP051483792.

* cited by examiner

MEASUREMENT CONFIGURATION METHOD AND APPARATUS

CROSS-REFERENCE TO RELATED APPLICATIONS

This is a U.S. National Stage of International Patent Application No. PCT/CN2020/127106 filed on Nov. 6, 2020, which claims priority to Chinese Patent Application No. 201911089857.4 filed on Nov. 8, 2019, both of which are hereby incorporated by reference in their entireties.

TECHNICAL FIELD

This application relates to the field of communications technologies, and in particular, to a measurement configuration method and an apparatus.

BACKGROUND

Based on a capability of a terminal device, the terminal device may measure an inter-frequency or inter-RAT neighboring cell in a measurement window-flee measurement manner or a measurement window measurement manner. If the terminal device has a plurality of radio frequency channels, and can support receiving a signal in the inter-frequency or inter-RAT neighboring cell while receiving and sending a signal in a serving cell, the terminal device supports measuring a signal of the inter-frequency or inter-RAT neighboring cell in the measurement window-free measurement manner. Otherwise, the terminal device needs to measure the signal of the inter-frequency or inter-RAT neighboring cell in the measurement window measurement manner. The terminal device stops receiving and sending the signal in the serving cell in a measurement window, adjusts the radio frequency channels to a frequency of the inter-frequency or inter-RAT neighboring cell, and receives the signal of the inter-frequency or inter-RAT neighboring cell. The network device semi-persistently configures the measurement window by using RRC signaling.

For a 5G cell, the measurement window includes a sending time period of an SSB of a neighboring cell. However, 5G supports bandwidth parts (bandwidth parts, BWPs), some of the BWPs have SSBs (that is, frequency domain resources corresponding to the BWPs include frequency domain resources corresponding to the SSBs) and associated remaining minimum system information (remaining minimum system information, RMSI), some of the BWPs have SSBs but do not have associated RMSI, and some of the BWPs do not even have SSBs. Therefore, during BWP switching, based on a capability of the terminal device and a configuration status of the measurement window, a plurality of complex combinations may occur. In these scenarios, how the terminal device measures the inter-frequency or inter-RAT neighboring cell is a problem that urgently needs to be resolved.

SUMMARY

Embodiments of this application provide a measurement configuration method and apparatus, to implement that a terminal device measures an inter-frequency or inter-RAT neighboring cell during BWP switching.

According to a first aspect, an embodiment of this application provides a measurement configuration method, where the method includes: A network device determines that a bandwidth part BWP occupied by a terminal device is switched from a first BWP to a second BWP; and the network device sends first information to the terminal device, where the first information indicates whether configuration information of a first measurement window takes effect when the terminal device occupies the second BWP, and the first measurement window is configured for the first BWP.

According to the foregoing method, the terminal device can determine, by using the first information, whether the configuration information of the first measurement window takes effect and a measurement manner used to measure an inter-frequency or inter-RAr neighboring cell after BWP switching.

In a possible design, a frequency domain resource corresponding to the first BWP includes a frequency domain resource corresponding to a first SSB, a frequency domain resource corresponding to the second BWP includes the frequency domain resource corresponding to the first SSB, and the terminal device supports a measurement window-flee measurement manner. The network device sends the first information to the terminal device, where the first information indicates that the configuration information of the first measurement window does not take effect.

In the foregoing method, the terminal device can determine, by using the first information, that the configuration information of the first measurement window does not take effect, and measure an inter-frequency or inter-RAT neighboring cell in the measurement window-free measurement manner after BWP switching.

In a possible design, a frequency domain resource corresponding to the first BWP includes a frequency domain resource corresponding to a first SSB, a frequency domain resource corresponding to the second BWP includes the frequency domain resource corresponding to the first SSB, and the terminal device does not support a measurement window-free measurement manner. The network device sends the first information to the terminal device, where the first information indicates that the configuration information of the first measurement window takes effect.

In the foregoing method, the terminal device can determine, by using the first information, that the configuration information of the first measurement window takes effect, and measure an inter-frequency or inter-RAT neighboring cell by using the first measurement window after BWP switching.

In a possible design, a frequency domain resource corresponding to the first BWP includes a frequency domain resource corresponding to a first SSB, and a frequency domain resource corresponding to the second BWP does not include the frequency domain resource corresponding to the first SSB: or a frequency domain resource corresponding to the second. BWP includes a frequency domain resource corresponding to a first SSB, and a frequency domain resource corresponding to the first BWP does not include the frequency domain resource corresponding to the first SSB. The network device sends the first information to the terminal device, where the first information indicates that the configuration information of the first measurement window does not take effect. The network device sends configuration information of a second measurement window to the terminal device, where the second measurement window includes a sending time period of the first SSB.

In the foregoing method, the terminal device can determine, by using the first information, that the configuration information of the first measurement window does not take effect, and measure an inter-frequency or inter-RAT neighboring cell by using the second measurement window after BWP switching.

In a possible design, a frequency domain resource corresponding to the first BWP includes a frequency domain resource corresponding to a first SSB, a frequency domain resource corresponding to the second BWP does not include the frequency domain resource corresponding to the first SSB, and the frequency domain resource corresponding to the second BWP includes a frequency domain resource corresponding to a second SSB. The network device sends the first information to the terminal device, where the first information indicates that the configuration information of the first measurement window does not take effect. The network device sends configuration information of a second measurement window and configuration information of the second SSB to the terminal device, where the second measurement window includes a sending time period of the second SSB.

In the foregoing method, the terminal device can determine, by using the first information, that the configuration information of the first measurement window does not take effect, and measure an inter-frequency or inter-RAT neighboring cell by using the second measurement window after BWP switching.

In a possible design, a frequency domain resource corresponding to the first BWP includes a frequency domain resource corresponding to a first SSB, a frequency domain resource corresponding to the second BWP does not include the frequency domain resource corresponding to the first SSB, the frequency domain resource corresponding to the second BWP includes a frequency domain resource corresponding to a second SSB, and the terminal device supports a measurement window-free measurement manner. The network device sends the first information to the terminal device, where the first information indicates that the configuration information of the first measurement window does not take effect. The network device sends configuration information of the second SSB to the terminal device.

In the foregoing method, the terminal device can determine, by using the first information, that the configuration information of the first measurement window does not take effect, and measure an inter-frequency or inter-RAT neighboring cell in the measurement window-free measurement manner based on the configuration information of the second SSB after BWP switching.

In a possible design, the first information is carried by DCI.

According to a second aspect, an embodiment of this application provides a measurement configuration method, where the method includes: A network device determines that a BWP occupied by a terminal device is switched from a first BWP to a second BWP; and the network device sends configuration information of a second measurement window to the terminal device, where the second measurement window is configured for the second BWP.

According to the foregoing method, the terminal device can determine, by using the configuration information of the second measurement window, a manner to measure the inter-frequency or inter-RAT neighboring cell after BWP switching.

In a possible design, a frequency domain resource corresponding to the first BWP includes a frequency domain resource corresponding to a first SSB, and a frequency domain resource corresponding to the second BWP includes the frequency domain resource corresponding to the first SSB; and the network device sends the configuration information of the second measurement window for the second BWP to the terminal device, where the configuration information of the second measurement window is empty.

In the foregoing method, the terminal device can determine, by using the configuration information of the second measurement window after BWP switching, to measure the inter-frequency or inter-RAT neighboring cell in the measurement window-free measurement manner if the terminal device supports the measurement window-free measurement manner, or to measure the inter-frequency or inter-RAT neighboring cell by using a first measurement window if the terminal device does not support the measurement window-free measurement manner.

In a possible design, a frequency domain resource corresponding to the first BWP includes a frequency domain resource corresponding to a first SSB, and a frequency domain resource corresponding to the second BWP does not include the frequency domain resource corresponding to the first SSB; or a frequency domain resource corresponding to the second BWP includes a frequency domain resource corresponding to a first SSB, and a frequency domain resource corresponding to the first BWP does not include the frequency domain resource corresponding to the first SSB. The network device sends the configuration information of the second measurement window for the second BWP to the terminal device, where the second measurement window includes a sending time period of the first SSB.

According to the foregoing method, the terminal device can determine, by using the configuration information of the second measurement window; to measure the inter-frequency or inter-RAT neighboring cell by using the second measurement window after BWP switching.

In a possible design, a frequency domain resource corresponding to the first BWP includes a frequency domain resource corresponding to a first SSB, a frequency domain resource corresponding to the second BWP does not include the frequency domain resource corresponding to the first SSB, and the frequency domain resource corresponding to the second BWP includes a frequency domain resource corresponding to a second SSB, The network device sends configuration information of the second SSB to the terminal device. The network device sends the configuration information of the second measurement window for the second BWP to the terminal device, where the second measurement window includes a sending time period of the second SSB.

According to the foregoing method, the terminal device can determine, by using the configuration information of the second measurement window, to measure the inter-frequency or inter-RAT neighboring cell by using the second measurement window after BWP switching.

In a possible design, a frequency domain resource corresponding to the first BWP includes a frequency domain resource corresponding to a first SSB, a frequency domain resource corresponding to the second BWP does not include the frequency domain resource corresponding to the first SSB, the frequency domain resource corresponding to the second BWP includes a frequency domain resource corresponding to a second SSB, and the terminal device supports a measurement window-free measurement manner. The network device sends configuration information of the second SSB to the terminal device. The network device sends the configuration information of the second measurement window for the second BWP to the terminal device, where the configuration information of the second measurement window is empty.

According to the foregoing method, the terminal device can determine, by using the configuration information of the second measurement window and the configuration information of the second SSB, to measure the inter-frequency or inter-RAT neighboring cell in the measurement window-free measurement manner after BWP switching.

According to a third aspect, an embodiment of this application provides a measurement configuration method, where the method includes: A terminal device determines that a BWP occupied by the terminal device is switched from a first BWP to a second BWP; and the terminal device receives first information from a network device, where the first information indicates whether configuration information of a first measurement window takes effect when the terminal device occupies the second BWP, and the first measurement window is configured for the first BWP.

According to the foregoing method, the terminal device can determine, by using the first information, whether the configuration information of the first measurement window takes effect and a measurement manner used to measure an inter-frequency or inter-RAT neighboring cell after BWP switching.

In a possible design, a frequency domain resource corresponding to the first BWP includes a frequency domain resource corresponding to a first synchronization signal block SSB, a frequency domain resource corresponding to the second BWP includes the frequency domain resource corresponding to the first SSB, and the terminal device supports a measurement window-free measurement manner. The terminal device receives the first information from the network device, where the first information indicates that the configuration information of the first measurement window does not take effect. The terminal device measures the first SSB in the measurement-free window measurement manner.

In the foregoing method, the terminal device can determine, by using the first information, that the configuration information of the first measurement window does not take effect, and measure an inter-frequency or inter-RAT neighboring cell in the measurement window-free measurement manner after BWP switching.

In a possible design, a frequency domain resource corresponding to the first BWP includes a frequency domain resource corresponding to a first SSB, a frequency domain resource corresponding to the second BWP includes the frequency domain resource corresponding to the first SSB, and the terminal device does not support measurement window-free measurement. The terminal device receives the first information from the network device, where the first information indicates that the configuration information of the first measurement window takes effect. The terminal device measures the first SSB in the first measurement window.

In the foregoing method, the terminal device can determine, by using the first information, that the configuration information of the first measurement window takes effect, and measure an inter-frequency or inter-RAT neighboring cell by using the first measurement window after BWP switching.

In a possible design, a frequency domain resource corresponding to the first BWP includes a frequency domain resource corresponding to a first SSB, and a frequency domain resource corresponding to the second BWP does not include the frequency domain resource corresponding to the first SSB; or a frequency domain resource corresponding to the second BWP includes a frequency domain resource corresponding to a first SSB, and a frequency domain resource corresponding to the first BWP does not include the frequency domain resource corresponding to the first SSB. The terminal device receives the first information from the network device, where the first information indicates that the configuration information of the first measurement window does not take effect. The terminal device receives configuration information of a second measurement window from the network device, where the second measurement window includes a sending time period of the first SSB. The terminal device measures the first SSB in the second measurement window.

In the foregoing method, the terminal device can determine, by using the first information, that the configuration information of the first measurement window does not take effect, and measure an inter-frequency or inter-RAT neighboring cell by using the second measurement window after BWP switching.

In a possible design, a frequency domain resource corresponding to the first BWP includes a frequency domain resource corresponding to a first SSB, a frequency domain resource corresponding to the second BWP does not include the frequency domain resource corresponding to the first SSB, and the frequency domain resource corresponding to the second BWP includes a frequency domain resource corresponding to a second SSB. The terminal device receives the first information from the network device, where the first information indicates that the configuration information of the first measurement window does not take effect. The terminal device receives configuration information of a second measurement window and configuration information of the second SSB from the network device, where the second measurement window includes a sending time period of the second SSB. The terminal device measures the second SSB in the second measurement window.

In the foregoing method, the terminal device can determine, by using the first information, that the configuration information of the first measurement window does not take effect, and measure an inter-frequency or inter-RAT neighboring cell by using the second measurement window after BWP switching.

In a possible design, a frequency domain resource corresponding to the first BWP includes a frequency domain resource corresponding to a first SSB, a frequency domain resource corresponding to the second BWP does not include the frequency domain resource corresponding to the first SSB, the frequency domain resource corresponding to the second BWP includes a frequency domain resource corresponding to a second SSB, and the terminal device supports a measurement window-free measurement manner. The terminal device receives the first information from the network device, where the first information indicates that the configuration information of the first measurement window does not take effect. The terminal device receives configuration information of the second SSB from the network device. The terminal device measures the second SSB in the measurement-free window measurement manner.

In the foregoing method, the terminal device can determine, by using the first information, that the configuration information of the first measurement window does not take effect, and measure an inter-frequency or inter-RAT neighboring cell in the measurement window-free measurement manner based on the configuration information of the second SSB after BWP switching.

In a possible design, the first information is carried by DCI.

According to a fourth aspect, an experimental embodiment of this application provides a measurement configuration method, where the method includes: A terminal device determines that a BWP occupied by the terminal device is switched from a first BWP to a second BWP; and the terminal device receives configuration information of a second measurement window from a network device, where the second measurement window is configured for the second BWP.

According to the foregoing method, the terminal device can determine, by using the configuration information of the second measurement window, a manner to measure the inter-frequency or inter-RAF neighboring cell after BWP switching.

In a possible design, a frequency domain resource corresponding to the first BWP includes a frequency domain resource corresponding to a first SSB, and a frequency domain resource corresponding to the second BWP includes the frequency domain resource corresponding to the first SSB, The terminal device receives the configuration information of the second measurement window from the network device, where the configuration information of the second measurement window is empty. If the terminal device supports a measurement window-free measurement manner, the terminal device measures the first SSB in the measurement window-free measurement manner. If the terminal device does not support a measurement window-free measurement manner, the terminal device measures the first SSB in a first measurement window, where the first measurement window is configured for the first BWP.

In the foregoing method, the terminal device can determine, by using the configuration information of the second measurement window after BWP switching, to measure the inter-frequency or inter-RAT neighboring cell in the measurement window-free measurement manner if the terminal device supports the measurement window-free measurement manner, or to measure the inter-frequency or inter-RAT neighboring cell by using a first measurement window if the terminal device does not support the measurement window-free measurement manner.

In a possible design, a frequency domain resource corresponding to the first BWP includes a frequency domain resource corresponding to a first SSB, and a frequency domain resource corresponding to the second BWP does not include the frequency domain resource corresponding to the first SSB; or a frequency domain resource corresponding to the second BWP includes a frequency domain resource corresponding to a first SSB, and a frequency domain resource corresponding to the first BWP does not include the frequency domain resource corresponding to the first SSB. The terminal device receives the configuration information of the second measurement window from the network device, where the second measurement window includes a sending time period of the first SSB. The terminal device measures the first SSB in the second measurement window.

According to the foregoing method, the terminal device can determine, by using the configuration information of the second measurement window, to measure the inter-frequency or inter-RAT neighboring cell by using the second measurement window after BWP switching.

In a possible design, a frequency domain resource corresponding to the first BWP includes a frequency domain resource corresponding to a first SSB, a frequency domain resource corresponding to the second. BWP does not include the frequency domain resource corresponding to the first SSB, and the frequency domain resource corresponding to the second BWP includes a frequency domain resource corresponding to a second SSB. The terminal device receives the configuration information of the second measurement window from the network device, where the second measurement window includes a sending time period of the second SSB. The terminal device receives configuration information of the second SSB from the network device. The terminal device measures the second SSB in the second measurement window.

According to the foregoing method, the terminal device can determine, by using the configuration information of the second measurement window, to measure the inter-frequency or inter-RAT neighboring cell by using the second measurement window after BWP switching.

In a possible design, a frequency domain resource corresponding to the first BWP includes a frequency domain resource corresponding to a first SSB, a frequency domain resource corresponding to the second BWP does not include the frequency domain resource corresponding to the first SSB, the frequency domain resource corresponding to the second BWP includes a frequency domain resource corresponding to a second SSB, and the terminal device supports a measurement window-free measurement manner. The terminal device receives the configuration information of the second measurement window from the network device, where the configuration information of the second measurement window is empty. The terminal device receives configuration information of the second SSB from the network device. The terminal device measures the second SSB in the measurement-free window measurement manner.

According to the foregoing method, the terminal device can determine, by using, the configuration information of the second measurement window and the configuration information of the second SSB, to measure the inter-frequency or inter-RAT neighboring cell in the measurement window-free measurement manner after BWP switching.

According to a fifth aspect, an embodiment of this application provides a communications apparatus. The apparatus may be a network device, or may be a chip in the network device. The apparatus may include a processing unit, a sending unit, and a receiving unit. It should be understood that the sending unit and the receiving unit herein may alternatively be a transceiver unit. When the apparatus is a network device, the processing unit may be a processor, and the sending unit and the receiving unit may be transceivers. The network device may further include a storage unit, and the storage unit may be a memory. The storage unit is configured to store instructions, and the processing unit executes the instructions stored in the storage unit, so that the network device performs the method according to any one of the first aspect or the possible designs of the first aspect, or the method according to any one of the second aspect or the possible designs of the second aspect. When the apparatus is the chip in the network device, the processing unit may be a processor, and the sending unit and the receiving unit may be an input/output interface, a pin, a circuit, or the like. The processing unit executes the instructions stored in the storage unit, so that the chip performs the method according to any one of the first aspect or the possible designs of the first aspect, or the method according to any one of the second aspect or the possible designs of the second aspect. The storage unit is configured to store the instructions. The storage unit may be a storage unit (for example, a register or a cache) in the chip, or may be a storage unit (for example, a read-only memory or a random access memory) that is in the network device and that is located outside the chip.

According to a sixth aspect, an embodiment of this application provides a communications apparatus. The apparatus may be a terminal device, or may be a chip in the terminal device. The apparatus may include a processing unit, a sending unit, and a receiving unit. It should be understood that the sending unit and the receiving unit herein may alternatively be a transceiver unit. When the apparatus is a terminal device, the processing unit may be a processor, and the sending unit and the receiving unit may be transceivers. The terminal device may further include a storage unit, and the storage unit may be a memory. The storage unit is configured to store instructions, and the processing unit executes the instructions stored in the storage unit, so that the terminal device performs the method according to any one of the third aspect or the possible designs of the third aspect, or the method according to any one of the fourth aspect or the possible designs of the fourth aspect. When the apparatus is the chip in the terminal device, the processing unit may be a processor, and the sending unit and the receiving unit may be an input/output interface, a pin, a circuit, or the like. The processing unit executes the instructions stored in the storage unit, so that the chip performs the method according to any one of the third aspect or the possible designs of the third aspect, or the method according to any one of the fourth aspect or the possible designs of the fourth aspect. The storage unit is configured to store the instructions. The storage unit may be a storage unit (for example, a register or a cache) in the chip, or may be a storage unit (for example, a read-only memory or a random access memory) that is in the terminal device and that is located outside the chip.

According to a seventh aspect, an embodiment of this application further provides a computer-readable storage medium. The computer-readable storage medium stores a computer program. When the computer program runs on a computer, the computer is enabled to perform the methods according to the first to the fourth aspects.

According to an eighth aspect, an embodiment of this application further provides a computer program product including a program. When the computer program product runs on a computer, the computer is enabled to perform the methods according to the first to the fourth aspects.

BRIEF DESCRIPTION OF DRAWINGS

FIG. 2(*b*) is a schematic diagram in which UE moves among a plurality of cells according to this application;

DESCRIPTION OF EMBODIMENTS

The following describes the embodiments of this application with reference to accompanying drawings.

Figure 1:
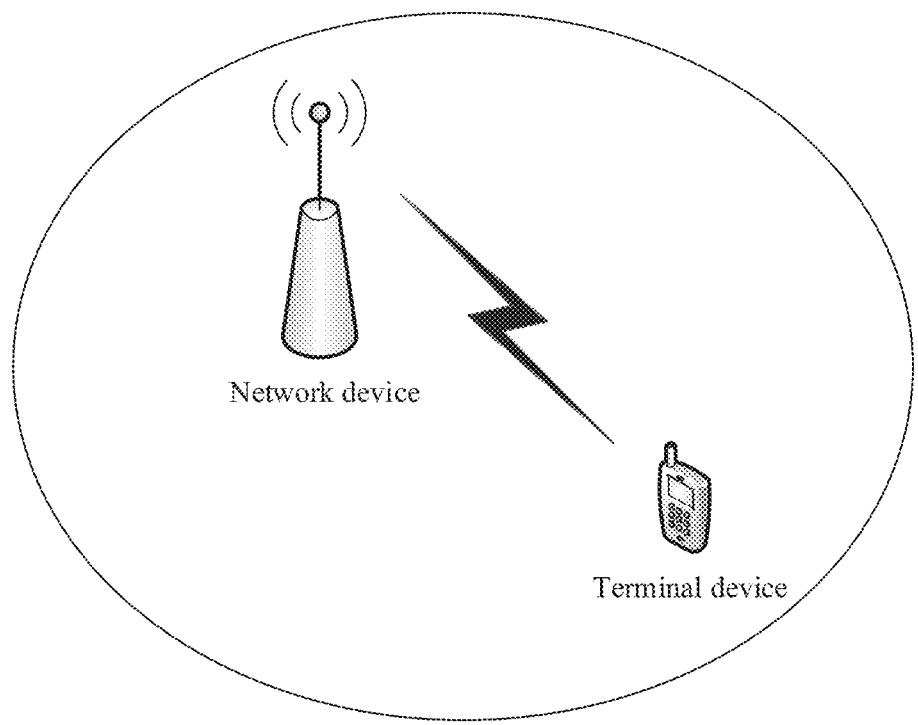
FIG. 1 is an architectural diagram of a communications system according to this application.

Network elements in the embodiments of this application include a network device and a terminal device, as shown in FIG. 1.

The network device is an entity used to transmit or receive a signal on a network side, for example, a generation NodeB (generation NodeB, gNodeB). The network device may be a device configured to communicate with a mobile device. The network device may be an AP in a wireless local area network (wireless local area networks, WLAN), or a base transceiver station (base transceiver station, BTS) in a global system for mobile communications (global system for mobile communications, GSM) or code division multiple access (Code Division Multiple Access, CDMA); may be a base station (NodeB, NB) in wideband code division multiple access (Wideband Code Division Multiple Access, WCDMA); may be an evolved NodeB (evolutional NodeB, eNB or eNodeB) in long term evolution (Long Term Evolution, LTE), or a relay station or an access point or integrated access and backhaul (integrated access and backhaul, IAB), or a vehicle-mounted device, a wearable device, a network device in a future 5G network, a network device in a future evolved public land mobile network (public land mobile network, PLMN) network, a gNodeB in an NR system, or the like. In addition, in this embodiment of this application, the network device provides a service for a cell, and the terminal device communicates with the network device by using a transmission resource (for example, a frequency domain resource, or a spectrum resource) used by the cell. The network device in this embodiment of this application may be a centralized unit (central unit, CU) or a distributed unit (distributed unit, DU), or the network device may include a CU and a DU. The CU and the DU may be physically separated, or may be deployed together. This is not specifically limited in the embodiments of this application. One CU may be connected to one DU, or a plurality of DUs may share one CU. This can reduce costs and facilitate network expansion. The CU and the DU may be split based on a protocol stack. In a possible manner, a radio resource control (Radio Resource Control, RRC) layer, a service data adaptation protocol stack (Service Data Adaptation Protocol, SDAP) layer, and a packet data convergence protocol (Packet Data Convergence Protocol. PDCP) layer are deployed on the CU. A radio link control (Radio Link Control, RLC) layer, a media, access control (Media Access Control, MAC) layer, and a physical layer are deployed on the DU. In the present invention, the foregoing method for splitting the protocol stack is not completely limited, and there may be another splitting method. The CU and the DU are connected through an F1 interface. The CU indicates that the gNB is connected to a core network through an Ng interface. The network device in this embodiment of this application may be a centralized unit control plane (CU-CP) node or a centralized unit user plane (CU-UP) node, or the network device may be a CU-CP and a CU-UP. The CU-CP is responsible for a control plane function, and mainly includes the RRC and PDCP-C. The PDCP-C entity is mainly responsible for control plane data encryption and decryption, integrity protection, data transmission, and the like. The CU-UP is responsible for a user plane function, and mainly includes the SDAP and PDCP-U. The SDAP is mainly responsible for processing data of the core network and mapping a flow to a bearer. The PDCP-U is mainly responsible for data plane encryption and decryption, integrity protection, header compression, serial number maintenance, data transmission, and the like. The CU-CP is connected to the CU-UP through an E1 interface. The CU-CP indicates that the gNB is connected to the core network through the Ng interface. The CU-CP is connected to the DU through an F1-C (a control plane). The CU-UP is connected to the DU through an F1-U (a user plane). Certainly, in another possible implementation, the PDCP-C is on the CU-UP. The access network device mentioned in the embodiments of this application may be a device including a CU or a DU, or a device including a CU and a DU, or a device including a control plane CU node (a CU-CP node), a user plane CU node (a CU-UP node), and a DU node. In addition, in another possible case, the network device may be another apparatus that provides a wireless communication function for the terminal device. A specific technology and a specific device form used by the network device are not limited in embodiments of this application. For ease of description, in this embodiment of this application, an apparatus that provides a wireless communication function for the terminal device is referred to as the network device.

The terminal device may be a wireless terminal device that can receive scheduling and indication information of the network device. The wireless terminal device may be a device that provides voice and/or data connectivity for a user, a handheld device with a wireless connection function, or another processing device connected to a wireless modem. The wireless terminal device may communicate with one or more core networks or the internet through a radio access network (radio access network, RAN). The wireless terminal device may be a mobile terminal device, for example, a mobile phone (also referred to as a "cellular" phone or a mobile phone (mobile phone)), a computer, and a data card. For example, the wireless terminal device may be a portable, pocket-sized, handheld, computer built-in, or in-vehicle mobile apparatus that exchanges language and/or data with the radio access network. For example, the device may include a personal communications service (personal communications service, PCS) phone, a cordless phone, a session initiation protocol (SIP) phone, a wireless local loop (wireless local loop, WLL) station, a personal digital assistant (personal digital assistant, PDA), a tablet computer (Pad), and a computer having wireless receiving and sending functions. The wireless terminal device may also be referred to as a system, a subscriber unit (subscriber unit), a subscriber station (subscriber station), a mobile station (mobile station), a mobile station (mobile station, MS), a remote station (remote station), an access point (access point, AP), a remote terminal device (remote terminal), an access terminal device (access terminal), a user terminal device (user terminal), a user agent (user agent), a subscriber station (subscriber station, SS), a customer premises equipment (customer premises equipment, CPE), a terminal (terminal), user equipment user equipment, UE), a mobile terminal (mobile terminal, MT), or the like. Alternatively, the wireless terminal device may be a wearable device or a next-generation communications system, for example, a terminal device in a 5G network, or a terminal device in a future evolved PLMN network, or a terminal device in a new radio (new radio, NR) communications system.

In addition, the embodiments of this application are also applicable to another future-oriented communications technology. Network architectures and service scenarios described in this application are intended to describe technical solutions in this application more clearly, but are not intended to limit the technical solutions provided in this application. A person of ordinary skill in the art may know that as the network architectures evolve and a new service scenario emerges, the technical solutions provided in this application are also applicable to a similar technical problem.

Figure 2A:
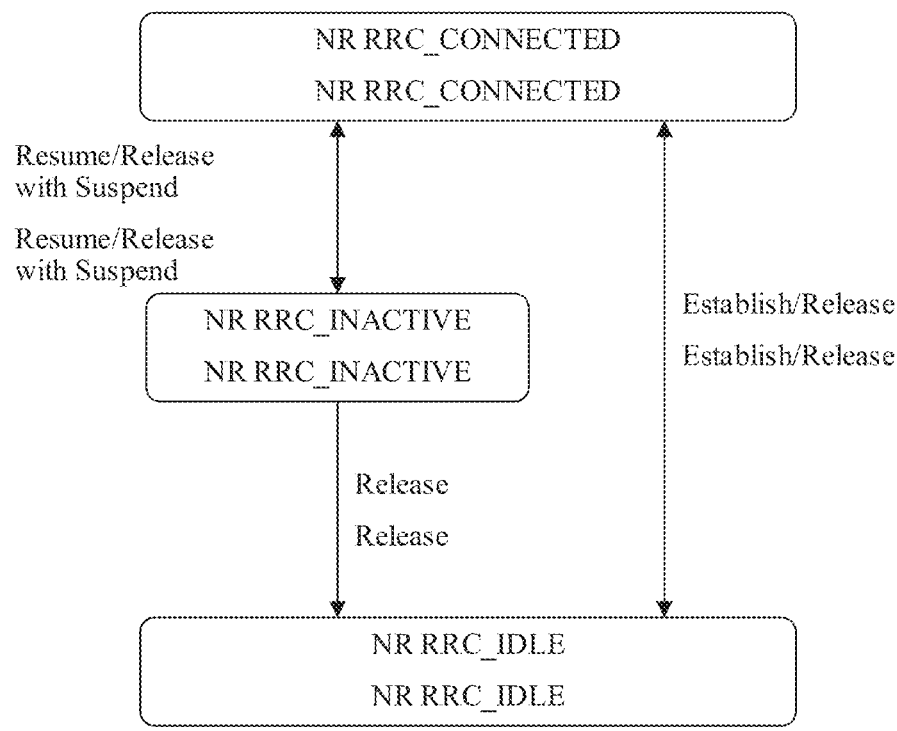
FIG. 2(*a*) is a schematic diagram of RRC state switching of UE according to this application.

In a 5G system, an RRC state of the UE includes a connected (RRC_CONNECTED) state, a deactivated (RRC_INACTIVE) state, and an idle (RRC_IDLE) state. Transitions among the three states are shown in FIG. 2(a). Compared with 4G LTE in which there are only two RRC states: RRC_IDLE and RRC_CONNECTED, 5G new radio (new radio, NR) introduces a new state, RRC_INACTIVE, to meet a requirement of low latency and low power consumption. FIG. 2(a) shows a schematic diagram of the RRC state of the UE and the transitions. The UE in the idle state may establish an RRC connection, switch to the connected state, and fall back to the idle state by releasing the RRC connection. When the UE in the connected state is in a low-demand state, the UE may delay releasing the RRC connection, to switch to the deactivated state, and fall back to the idle state by releasing the RRC connection.

Figure 2B:
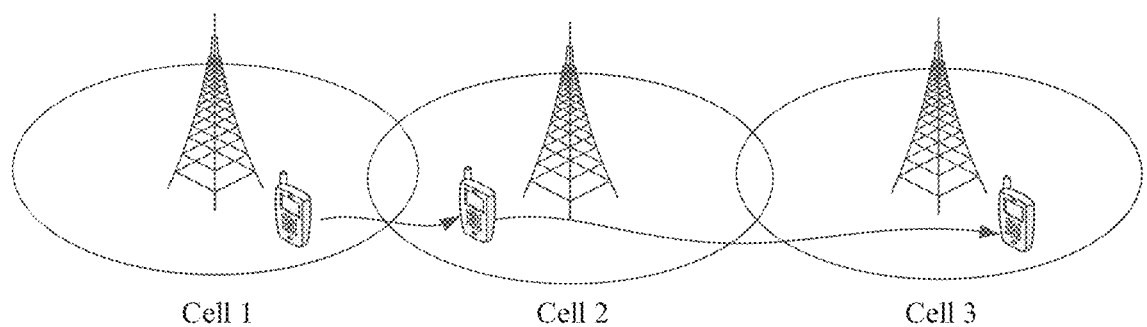

In mobile communication networks, mobility management for terminal devices is an important topic. The terminal device performs re-selection and switching between cells with different coverage areas, so as to obtain continuous services of a wireless network. Based on different RRC states between the terminal device and the network device, when the terminal device is in the idle state or in the inactive state, there is no RRC connection between the terminal device and the network device. When signal quality of a cell on which the terminal device camps is lower than a specific threshold, the terminal device measures signal quality of the camped cell and a neighboring cell based on intra-frequency, inter-frequency, and/or inter-RAT neighboring cell information configured by the network device in a system message, and determines whether the signal quality of the neighboring cell meets a cell re-selection condition. If the signal quality of the neighboring cell meets the cell re-selection condition, the terminal device camps on the neighboring cell. When the terminal device is in the connected state, an RRC connection exists between the terminal device and the network device, and the network device configures, by using RRC signaling, the terminal device to perform intra-frequency, inter-frequency, and/or inter-RAF neighboring cell measurement. The terminal device reports the signal quality measurement results of the serving cell and the neighboring cell to the network device by using RRC signaling, and the network device hands over the terminal device to a cell with better signal quality based on the measurement results. Therefore, both cell re-selection in the idle state and the deactivated state and cell handover in the connected state are based on the signal quality measurement results of the serving cell and the neighboring cell by the terminal device. For example, FIG. 2(b) is a schematic diagram in which a terminal device moves among a cell 1, a cell 2, and a cell 3.

For inter-frequency and/or inter-RAT neighboring cell measurement in the connected state, based on a capability of the terminal device, the terminal device may measure the inter-frequency and/or inter-RAT neighboring cell in a measurement window-free measurement manner and a measurement window measurement manner. Based on a capability of a terminal device, the terminal device may measure an inter-frequency or inter-RAI neighboring cell in a measurement window-free measurement manner or a measurement window measurement manner. If the terminal device has a plurality of radio frequency channels, and can support receiving a signal in the inter-frequency or inter-RAT neighboring cell while receiving and sending a signal in a serving cell, the terminal device supports measuring a signal of the inter-frequency or inter-RAT neighboring cell in the measurement window-free measurement manner. Otherwise, the terminal device needs to measure the signal of the inter-frequency or inter-RAF neighboring cell in the measurement window measurement manner. The terminal device stops receiving and sending the signal in the serving cell in a measurement window, adjusts a radio frequency channel to a frequency of the inter-frequency or inter-RAT neighboring cell, and receives the signal of the inter-frequency or inter-RAT neighboring cell. The network device semi-persistently configures the measurement window by using RRC signaling.

Figure 3:
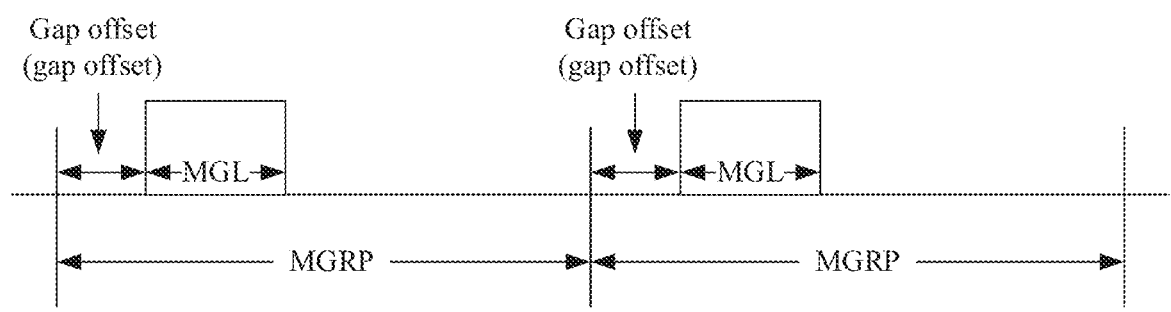
FIG. 3 is a schematic configuration diagram of a measurement window according to this application.

A schematic configuration diagram of a measurement window is shown in FIG. 3, and mainly includes three parameters: a measurement gap repetition period (measurement gap repetition period, MGRP) to configure a period of a measurement window; a measurement gap length (measurement gap length, MGL) to configure a length of the measurement window, and gap offset (gapOffset) to configure a start position of the measurement window. According to the three parameters, it may be determined that the measurement window starts on a system frame number (system frame number, SFN) and a subframe (subframe) that meet the following conditions:

SEN mod $T$=FLOOR(gapOffset/10);

subframe=gapOffset mod 10;

$T$=MGRP/10;

The foregoing SFN and subframe, are an SFN and a subframe of a primary cell (primary cell, PCell). A maximum MGL is 6 ms.

For inter-frequency and/or inter-RAT neighboring cell measurement in the idle state or in the deactivated state, because the terminal device does not need to send and receive data on the cell on which the terminal device camps, a measurement window may not need to be configured.

Figure 4:
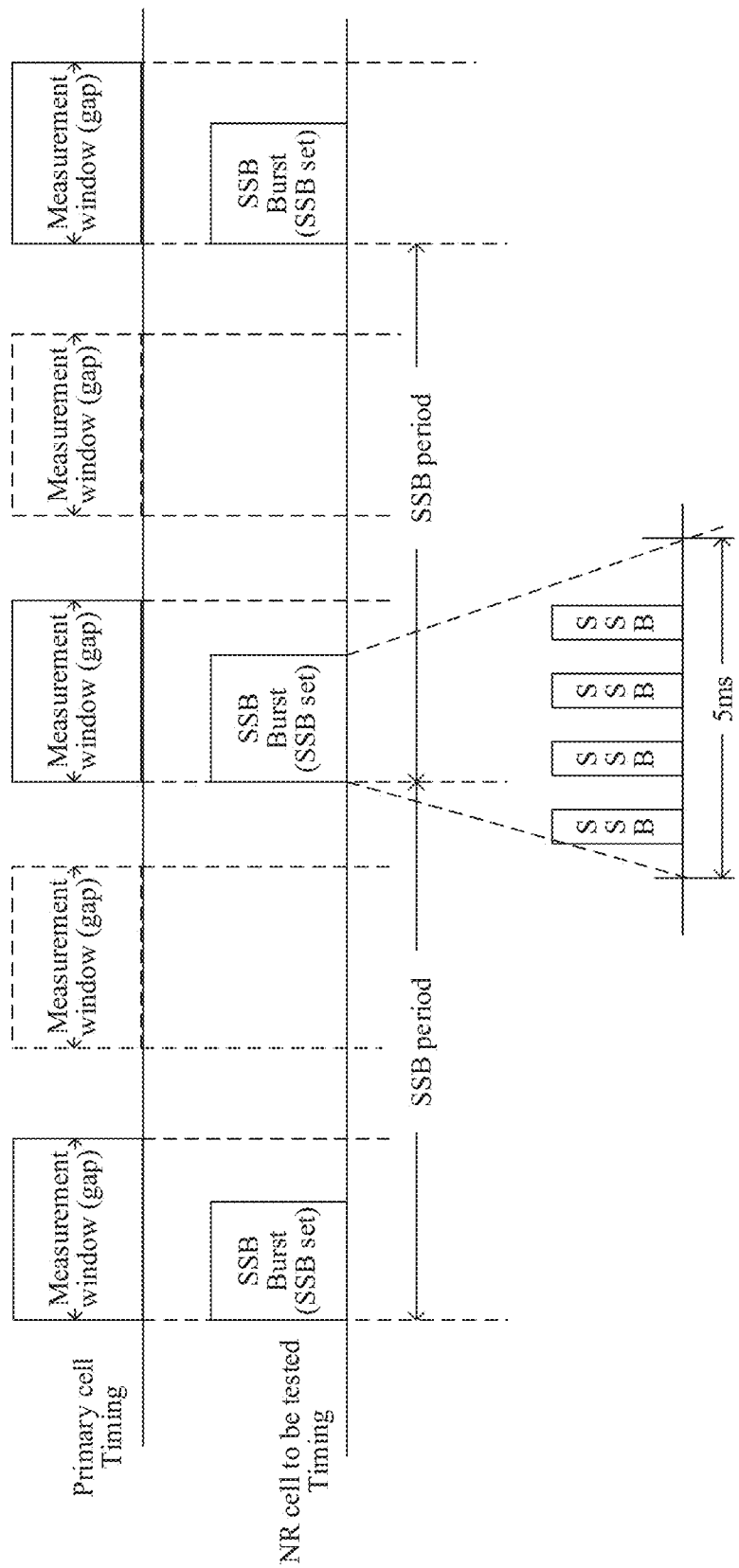
FIG. 4 is a schematic diagram of an SSB and a measurement window according to this application.

Neighboring NR cells may be measured based on a synchronization signal block (Synchronization Signal Block, SSB). However, due to particularity of SSB signal design, if a measurement manner for the measurement window is used to perform inter-frequency or inter-RAT neighboring cell measurement in the connected state, the network device needs to configure a measurement window that includes a sending time period of an SSB of a neighboring cell. As shown in FIG. 4, an SSB of an NR cell is sent periodically, and the period may be 5 ms, 10 ms, 20 ms, 40 ms, 80 ms, or 160 ms. A plurality of SSBs may be sent in a period, but all SSBs are sent in one 5 ms period to form an SSB burst (SSB burst). For example, if an SSB period is 20 ms, there are four 5 ms in one period, all SSBs are sent in one 5 ms, and no SSB is sent in the other three 5 ms. Therefore, when configuring the measurement window, the network device needs to enable the measurement window to include the sending time period of the SSB of the neighboring cell. Otherwise, the terminal device cannot receive the SSB of the neighboring NR cell in the measurement window, and therefore cannot detect the neighboring cell.

In addition, a time domain position of the measurement window refers to timing of the PCell, and a time domain position of the SSB is sent based on timing of the NR neighboring cell. To configure a correct measurement window position, the network device needs to know a timing offset between the PCell and the NR neighboring cell, so as to determine an SFN and a subframe number of the PCell corresponding to the SFN and the subframe number of the SSB of the neighboring NR cell. The timing offset between the PCell and the NR neighboring cell may be obtained by measuring a system frame number and frame timing difference (SFN and frame timing difference, SFTD) of the terminal device.

A bandwidth part (bandwidth part, BWP) is defined as a combination of a plurality of consecutive resource blocks (resource block, RB) in one carrier. The concept of the BWP is also introduced mainly so that the terminal device can better use a large carrier bandwidth. For a large carrier bandwidth, for example, 100 MHz, a bandwidth that needs to be used by a terminal device is usually limited. If the terminal device is enabled to perform full-bandwidth detection and maintenance in real time, power consumption of the terminal device is greatly challenged. The concept of the BWP is introduced to allocate a part of bandwidth in an entire carrier bandwidth for the terminal device to perform access and data transmission. The terminal device only needs to perform a corresponding operation within the bandwidth configured in the system.

Advantages of the BWP are as follows: supporting a terminal device with a low bandwidth capability to work in a cell with a large system bandwidth; making the terminal device monitor or send a control channel with low power consumption for example, in a low data period), and receive or send data with a large bandwidth in a high data transmission period; and adapting to different parameter sets (numerology).

BWP adaptation is supported in 5G, where BWP adaptation may be implemented in the following three manners: (1) BWP switching is semi-persistently configured by using RRC signaling. (2) BWP switching is dynamically indicated by using downlink control information (downlink control information, DCI). (3) The BWP is automatically switched when the timer expires.

When the terminal device enters the connected state from the idle state, a BWP of a cell on which the terminal device camps is referred to as an "initial BWP (initial BWP)".

The following describes, with reference to specific embodiments and scenarios, how to implement the inter-frequency or inter-RAT neighboring cell measurement by the terminal device during BWP switching.

For the following embodiment, a first BWP is a BWP occupied by the terminal device before BWP switching, and a second BWP is a BWP occupied by the terminal device after BWP switching. The first measurement window is a measurement window configured by the network device for the first BWP, and the second measurement window is a measurement window configured by the network device for the second BWP.

Scenario 1:

A frequency domain resource corresponding to the first BWP includes a frequency domain resource corresponding to a first SSB, a frequency domain resource corresponding to a second BWP includes the frequency domain resource corresponding to the first SSB, the first SSB is an SSB configured by the network device for an inter-frequency or inter-RAT neighboring cell that needs to be measured by the terminal device, and the terminal device supports a measurement window-free measurement manner.

The frequency domain resource corresponding to the first BWP includes the frequency domain resource corresponding to the first SSB, or may be described as having the first SSB on the first BWP. Alternatively, an overlapping part between the frequency domain resource corresponding to the first BWP and the frequency domain resource corresponding to the first SSB is the frequency domain resource corresponding to the first SSB.

Based on the foregoing scenario 1, this application provides two possible measurement configuration methods.

Figure 5:
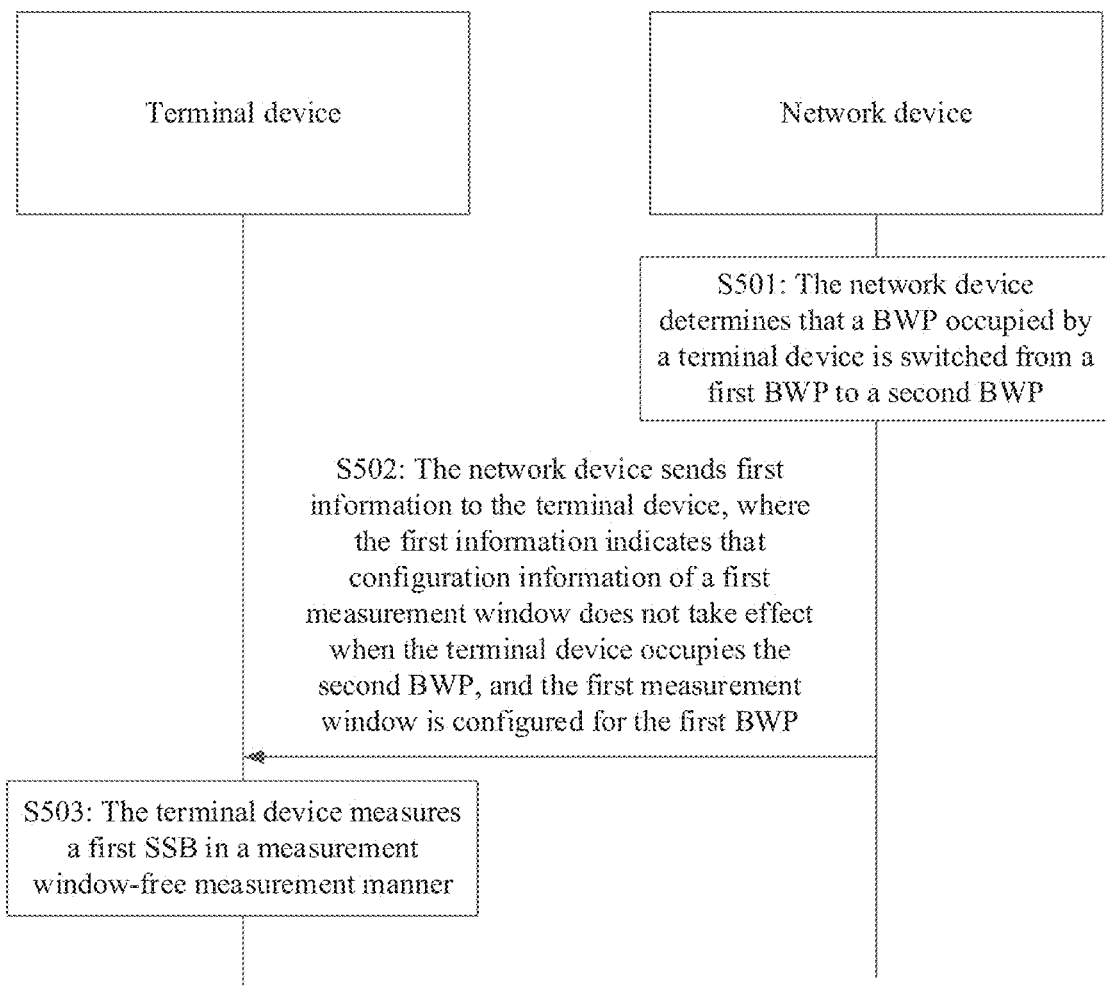
FIG. 5 is a first overview flowchart of a measurement configuration method according to this application.

Method 1:

FIG. 5 shows a measurement configuration method according to this application. The method includes the following steps.

S501: A network device determines that a BWP occupied by a terminal device is switched from a first BWP to a second BWP.

As described above, BWP adaptation may be implemented in the following three manners: (1) BWP switching is semi-persistently configured by using RRC signaling. (2) BWP switching is dynamically indicated by using DCI. (3) The BWP is automatically switched when the timer expires.

Therefore, the network device can determine BWP switching in any one of the foregoing three manners. Correspondingly, the terminal device may also determine BWP switching in any one of the foregoing manners. For example, the network device sends the DCI to the terminal device, where the DCI indicates the terminal device to switch from the first BWP to the second BWP. For another example, the network device determines that the first BWP is switched to the second BWP when the timer expires, and the terminal device determines that the first BWP is switched to the second BWP when the timer expires.

S502: The network device sends first information to the terminal device, where the first information indicates that configuration information of a first measurement window does not take effect when the terminal device occupies the second BWP, and the first measurement window is configured for the first BWP. Correspondingly, the terminal device receives the first information from the network device.

S503: The terminal device measures the first SSB in a measurement window-free measurement manner.

Figure 7:
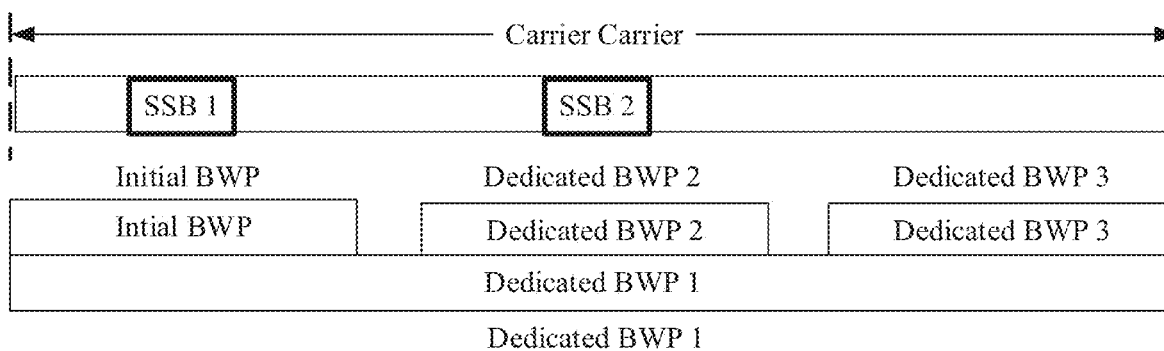
FIG. 7 is a schematic diagram of BWP switching according to this application.

In the foregoing method 1, the network device indirectly indicates or implicitly indicates the terminal device to measure the first SSB in a measurement window-free measurement manner by indicating that the configuration information of the first measurement window does not take effect. For example, as shown in FIG. 7, the network device configures an SSB of an inter-frequency or inter-RAT neighboring cell that needs to be measured by the terminal device as an SSB 1. The network device configures four BWPs for the terminal device. When the BWP occupied by the terminal device is switched from an initial BWP to a BWP 1 or from a BWP 1 to an initial BWP, because a frequency domain resource corresponding to the initial BWP and a frequency domain resource corresponding to the BWP 1 both include a frequency domain resource of the SSB 1, if the terminal device supports the measurement window-free measurement manner, the network device may indicate, by using one information field in one piece of DCI, that the configuration information of the first measurement window does not take effect. For example, the information field occupies one bit, "0" indicates that the configuration information of the first measurement window does not take effect, and "1" indicates that the configuration information of the first measurement window takes effect. The terminal device determines, based on the DCI, to measure the first SSB in the measurement window-free measurement manner.

Figure 6:
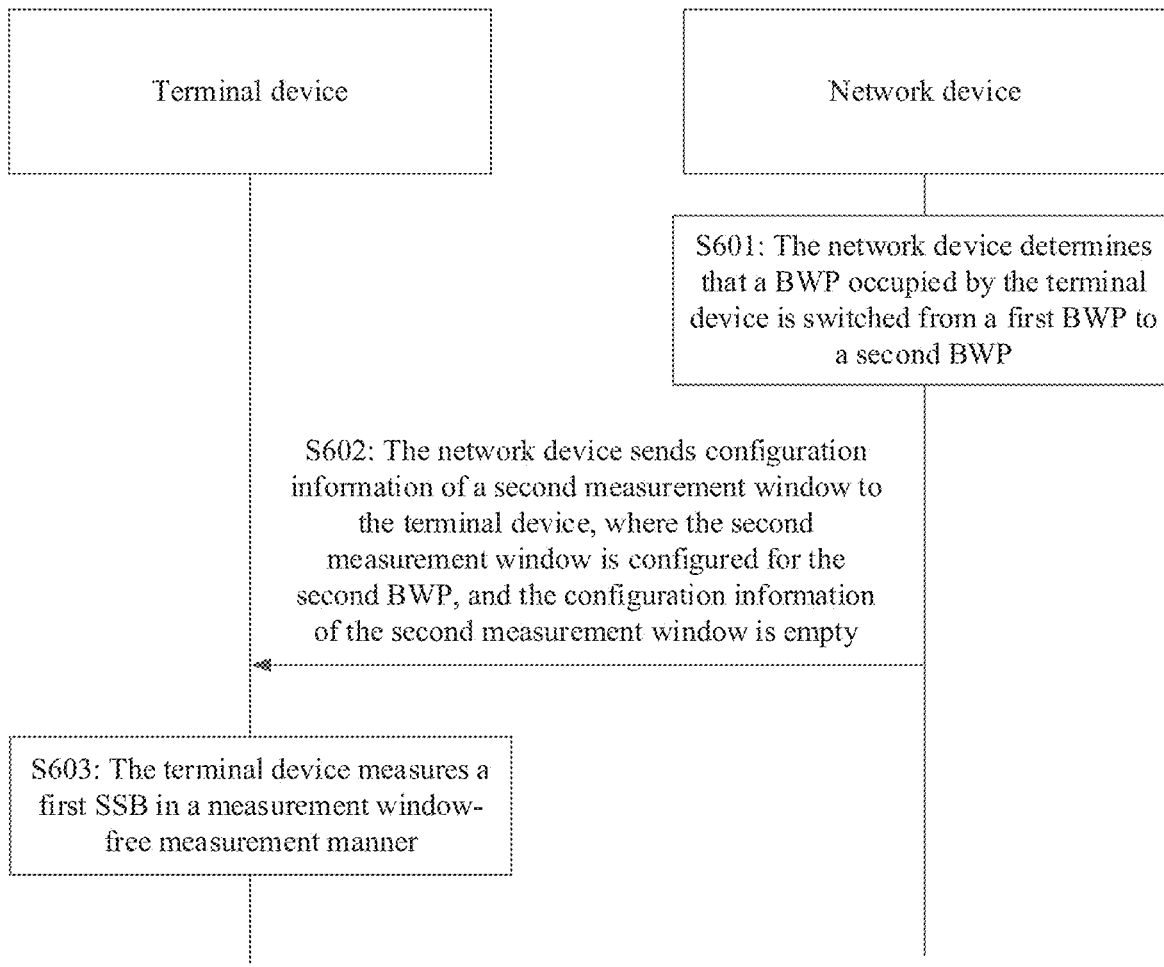
FIG. 6 is a second overview flowchart of a measurement configuration method according to this application.

Method 2:

FIG. 6 shows a measurement configuration method according to this application. The method includes the following steps.

S601: A network device determines that a BWP occupied by a terminal device is switched from a first BWP to a second BWP.

For details, refer to the description in S501. Details are not described herein again.

S602: The network device sends configuration information of a second measurement window to the terminal device, where the second measurement window is configured for the second BWP, and the configuration information of the second measurement window is empty. Correspondingly, the terminal device receives the configuration information of the second measurement window from the network device.

S603: The terminal device measures a first SSB in a measurement window-free measurement manner.

In the foregoing method 2, the network device does not configure measurement window information for the terminal device that supports the measurement window-free measurement manner, so that resource overheads of the measurement window can be reduced. For example, as shown in FIG. 7, the network device configures an SSB of an inter-frequency or inter-RAT neighboring cell that needs to be measured by the terminal device as an SSB 1. The network device configures four BWPs for the terminal device. When the BWP occupied by the terminal device is switched from an initial BWP to a BWP 1 or from a BWP 1 to an initial BWP, because a frequency domain resource corresponding to the initial BWP and a frequency domain resource corresponding to the BWP 1 both include a frequency domain resource of the SSB 1, if the terminal device supports the measurement window-free measurement manner, the network device may send the configuration information of the second measurement window, the configuration information of the second measurement window is empty, and the terminal device determines, based on the configuration information of the second measurement window, to use the measurement window-free measurement manner to measure the first SSB.

Scenario 2:

A frequency domain resource corresponding to the first BWP includes a frequency domain resource corresponding to a first SSB, a frequency domain resource corresponding to a second BWP includes the frequency domain resource corresponding to the first SSB, the first SSB is an SSB configured by the network device for an inter-frequency or inter-RAT neighboring cell that needs to be measured by the terminal device, and the terminal device does not support a measurement window-free measurement manner.

Based on the foregoing scenario 2, this application provides two possible measurement configuration methods.

Figure 8:
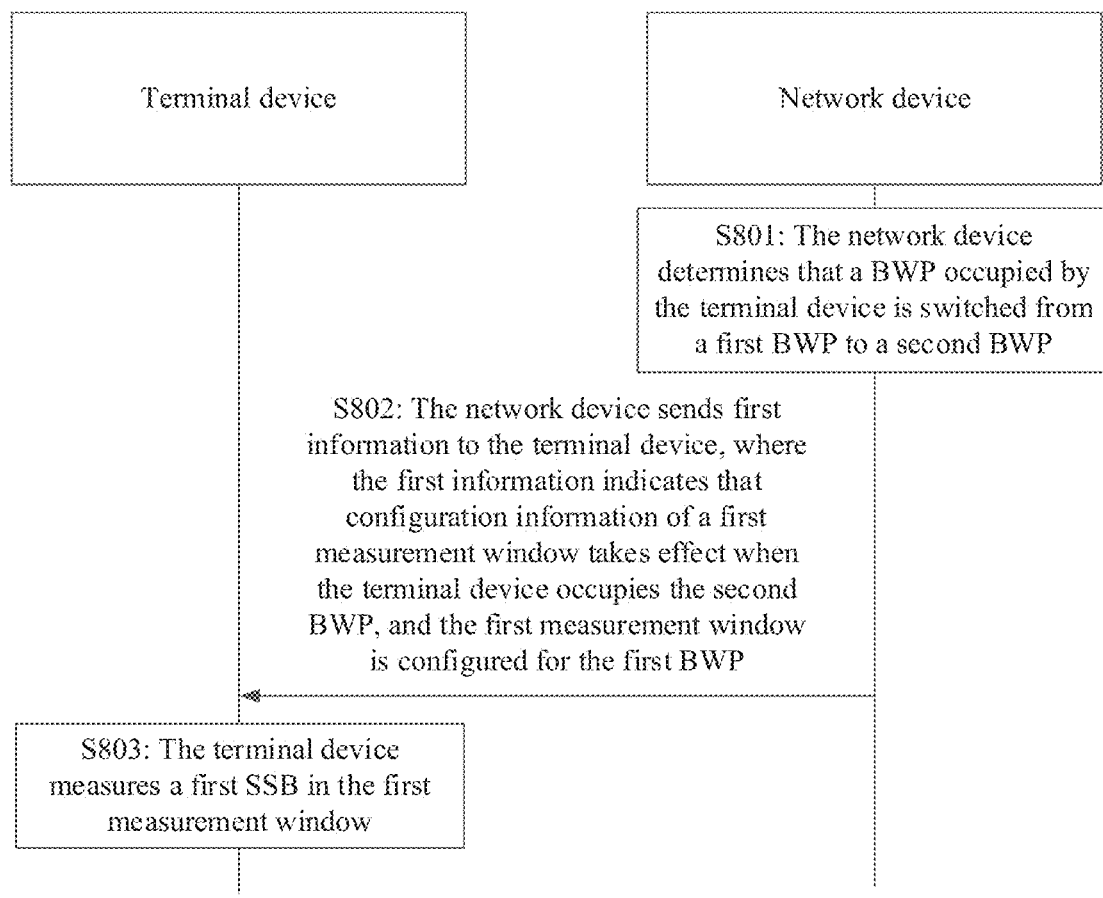
FIG. 8 is a third overview flowchart of a measurement configuration method according to this application.

Method 1:

FIG. 8 shows a measurement configuration method according to this application. The method includes the following steps.

S801: A network device determines that a bandwidth part BWP occupied by a terminal device is switched from a first BWP to a second BWP.

For details, refer to the description in S501. Details are not described herein again.

S802: The network device sends first information to the terminal device, where the first information indicates that configuration information of a first measurement window takes effect when the terminal device occupies the second BWP, and the first measurement window is configured for the first BWP. Correspondingly, the terminal device receives the first information from the network device.

S803: The terminal device measures the first SSB in the first measurement window.

Figure 9:
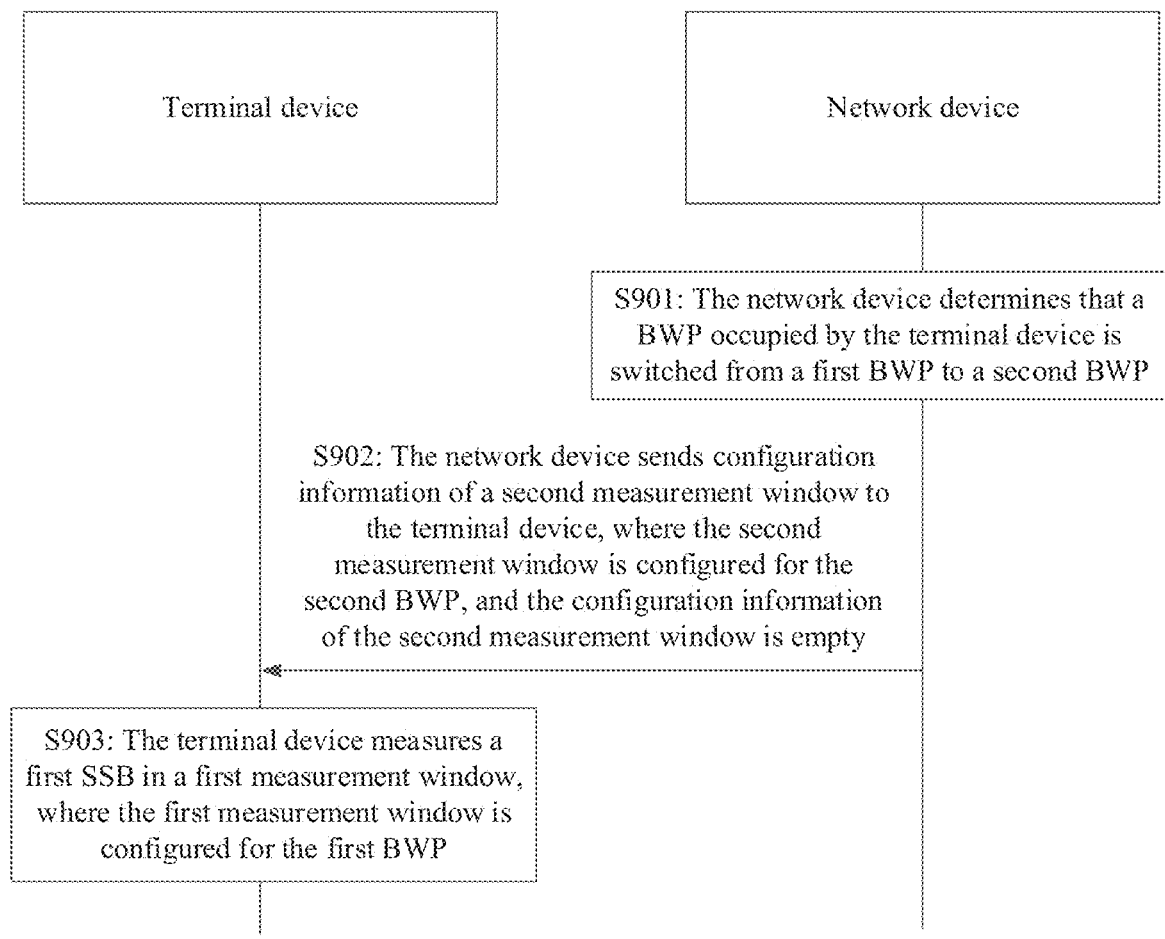
FIG. 9 is a fourth overview flowchart of a measurement configuration method according to this application.

In the foregoing method 1, the network device may not need to reconfigure the measurement window by indicating that the first measurement window takes effect. For example, as shown in FIG. 7, the network device configures an SSB of an inter-frequency or inter-RAT neighboring cell that needs to be measured by the terminal device as an SSB 1. The network device configures four BWPs for the terminal device. When the BWP occupied by the terminal device is switched from an initial BWP to a BWP 1 or from a BWP 1 to an initial BWP, because a frequency domain resource corresponding to the initial BWP and a frequency domain resource corresponding to the BWP 1 both include a frequency domain resource of the SSB 1, if the terminal device does not support the measurement window-free measurement manner, the network device may notify, by sending the first information, the terminal device that the configuration information of the first measurement window takes effect, that is, configuration information of a measurement window configured for the initial BWP takes effect, and the terminal device measures the first SSB in the first measurement window, and does not need to reconfigure the measurement window Method 2:

FIG. 9 shows a measurement configuration method according to this application. The method includes the following steps.

S901: A network device determines that a bandwidth part BWP occupied by a terminal device is switched from a first BWP to a second BWP.

For details, refer to the description in S501. Details are not described herein again.

S902: The network device sends configuration information of a second measurement window to the terminal device, where the second measurement window is configured for the second BWP, and the configuration information of the second measurement window is empty. Correspondingly, the terminal device receives the configuration information of the second measurement window from the network device.

S903: The terminal device measures a first SSB in a first measurement window, where the first measurement window is configured for the first BWP.

In the foregoing method 2, in the foregoing scenario 2, the network device does not need to reconfigure a measurement window, and the terminal device determines that the terminal device does not support the measurement window-free measurement manner, and may measure the first SSB by using the configured measurement window. For example, as shown in FIG. 7, the network device configures an SSB of an inter-frequency or inter-RAF neighboring cell that needs to be measured by the terminal device as an SSB 1, The network device configures four BWPs for the terminal device. When the BWP occupied by the terminal device is switched from an initial BWP to a BWP 1 or from a BWP 1 to an initial because a frequency domain resource corresponding to the initial BWP and a frequency domain resource corresponding to the BWP 1 both include a frequency domain resource of the SSB 1, if the terminal device does not support the measurement window-free measurement manner, the network device may send the configuration information of the second measurement window, where the configuration information of the second measurement window is empty, to indicate the terminal device to measure the first SSB in a measurement window configured for the initial BWP, and that the measurement window may not need to be reconfigured.

Scenario 3:

The first SSB is an SSB configured by the network device for an inter-frequency or inter-RAF neighboring cell that needs to be measured by the terminal device. A frequency domain resource corresponding to a first BWP includes a frequency domain resource corresponding to the first SSB, and a frequency domain resource corresponding to a second BWP does not include the frequency domain resource corresponding to the first SSB. Alternatively, a frequency domain resource corresponding to a first BWP does not include a frequency domain resource corresponding to the first SSB, and a frequency domain resource corresponding to a second BWP includes the frequency domain resource corresponding to the first SSB.

Based on the foregoing scenario 3, this application provides two possible measurement configuration methods.

Figure 10:
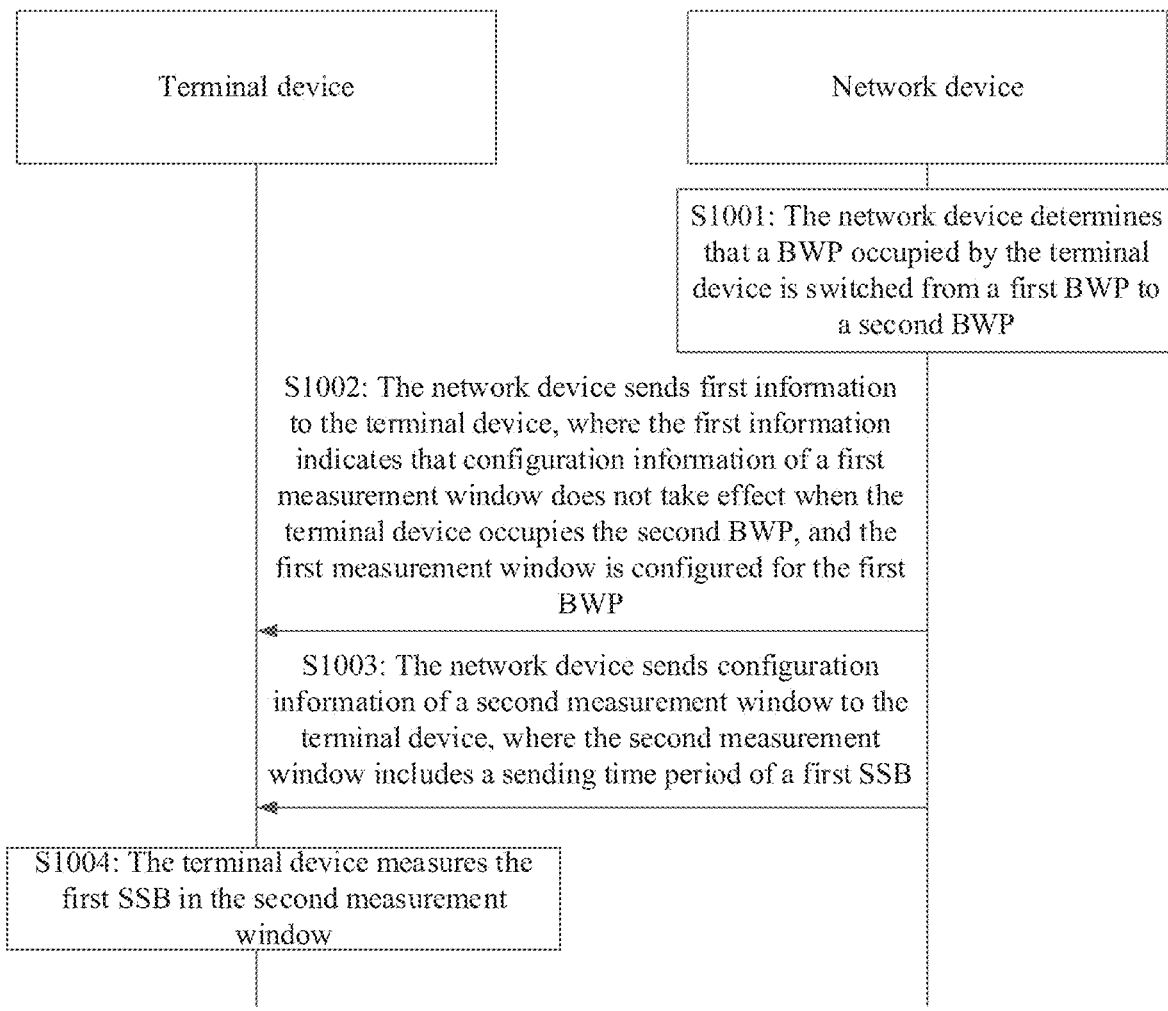
FIG. 10 is a fifth overview flowchart of a measurement configuration method according to this application.

Method 1:

FIG. 10 shows a measurement configuration method according to this application. The method includes the following steps.

S1001: A network device determines that a BWP occupied by a terminal device is switched from a first BWP to a second BWP.

For details, refer to the description in S501. Details are not described herein again.

S1002: The network device sends first information to the terminal device, where the first information indicates that configuration information of a first measurement window does not take effect when the terminal device occupies the second BWP, and the first measurement window is configured for the first BWP. Correspondingly, the terminal device receives the first information from the network device.

S1003: The network device sends configuration information of a second measurement window to the terminal device, where the second measurement window includes a sending time period of a first SSB. Correspondingly, the terminal device receives the configuration information of the second measurement window from the network device.

Because the configuration information of the first measurement window does not take effect, and a frequency domain resource corresponding to the first BWP and a frequency domain resource corresponding to the second BWP do not simultaneously include a frequency domain resource corresponding to the first SSB, the network device needs to reconfigure a new measurement window, so as to ensure that the terminal device can measure the first SSB.

S1004: The terminal device measures the first SSB in the second measurement window.

The terminal device stops, in the second measurement window, signal receiving and sending in a serving cell, adjusts a radio frequency channel to a frequency of an inter-frequency or inter-RAT neighboring cell, and measures the first SSB.

Figure 11:
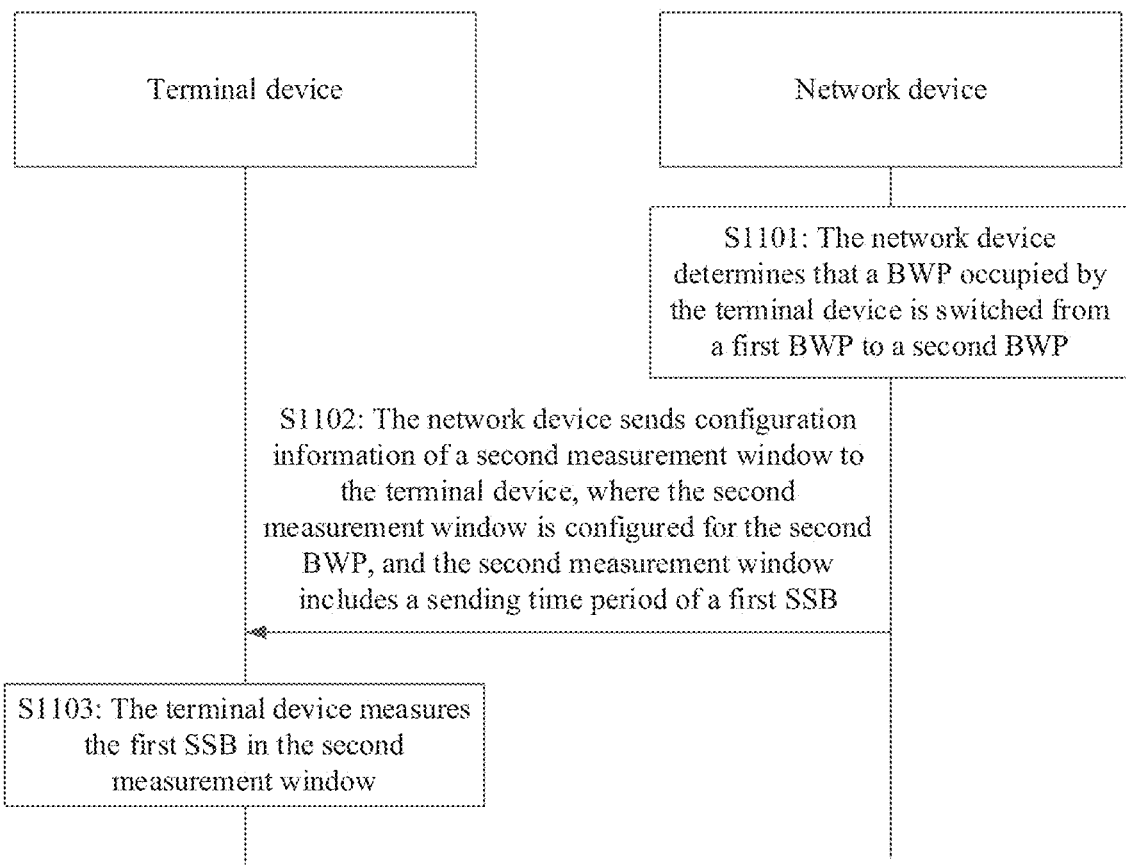
FIG. 11 is a sixth overview flowchart of a measurement configuration method according to this application.

In the foregoing method 1, the network device indicates that the configuration information of the first measurement window does not take effect, and a new measurement window is reconfigured, to ensure that the terminal device can measure the first SSB. For example, as shown in FIG. 7, the network device configures an SSB of an inter-frequency or inter-RAT neighboring cell that needs to be measured by the terminal device as an SSB 1. The network device configures four BWPs for the terminal device. When the BWP occupied by the terminal device is switched from an initial BWP to a BWP 3, or from a BWP 3 to an initial BWP, or from a BWP 2 to an initial BWP, or from an initial BWP to a BWP 2, because a frequency domain resource corresponding to the BWP 2 or the BWP 3 does not include a frequency domain resource of the SSB 1, the network device needs to configure a new measurement window, so that the terminal device measures the SSB 1 in the new measurement window Method 2:

FIG. 11 shows a measurement configuration method according to this application. The method includes the following steps.

S1101: A network device determines that a BWP occupied by a terminal device is switched from a first BWP to a second BWP.

For details, refer to the description in S501. Details are not described herein again.

S1102: The network device sends configuration information of a second measurement window to the terminal device, where the second measurement window is configured for the second BWP, and the second measurement window includes a sending time period of the first SSB. Correspondingly, the terminal device receives the configuration information of the second measurement window from the network device.

S1103: The terminal device measures the first SSB in the second measurement window.

In the foregoing method 2, the network device directly configures a new measurement window, to ensure that the terminal device can measure the first SSB.

For example, as shown in FIG. 7, the network device configures an SSB of an inter-frequency or inter-RAT neighboring cell that needs to be measured by the terminal device as an SSB 1. The network device configures four BWPs for the terminal device. When the BWP occupied by the terminal device is switched from an initial BWP to a BWP 3, or from a BWP 3 to an initial BWP, or from a BWP 2 to an initial BWP, or from an initial BWP to a BWP 2, because a frequency domain resource corresponding to the BWP 2 or the BWP 3 does not include a frequency domain resource of the SSB 1, the network device configures a new measurement window, so that the terminal device measures the first SSB in the new measurement window.

Scenario 4:

The first SSB is an SSB configured by the network device for an inter-frequency or inter-RAT neighboring cell that needs to be measured by the terminal device. The second SSB is an SSB reconfigured by the network device for the inter-frequency or inter-RAT neighboring cell that needs to be measured by the terminal device. A frequency domain resource corresponding to a first BWP includes a frequency domain resource corresponding to the first SSB, a frequency domain resource corresponding to a second BWP does not include the frequency domain resource corresponding to the first SSB, and the frequency domain resource corresponding to the second BWP includes a frequency domain resource corresponding to the second SSB.

Based on the foregoing scenario 4, this application provides two possible measurement configuration methods.

Figure 12:
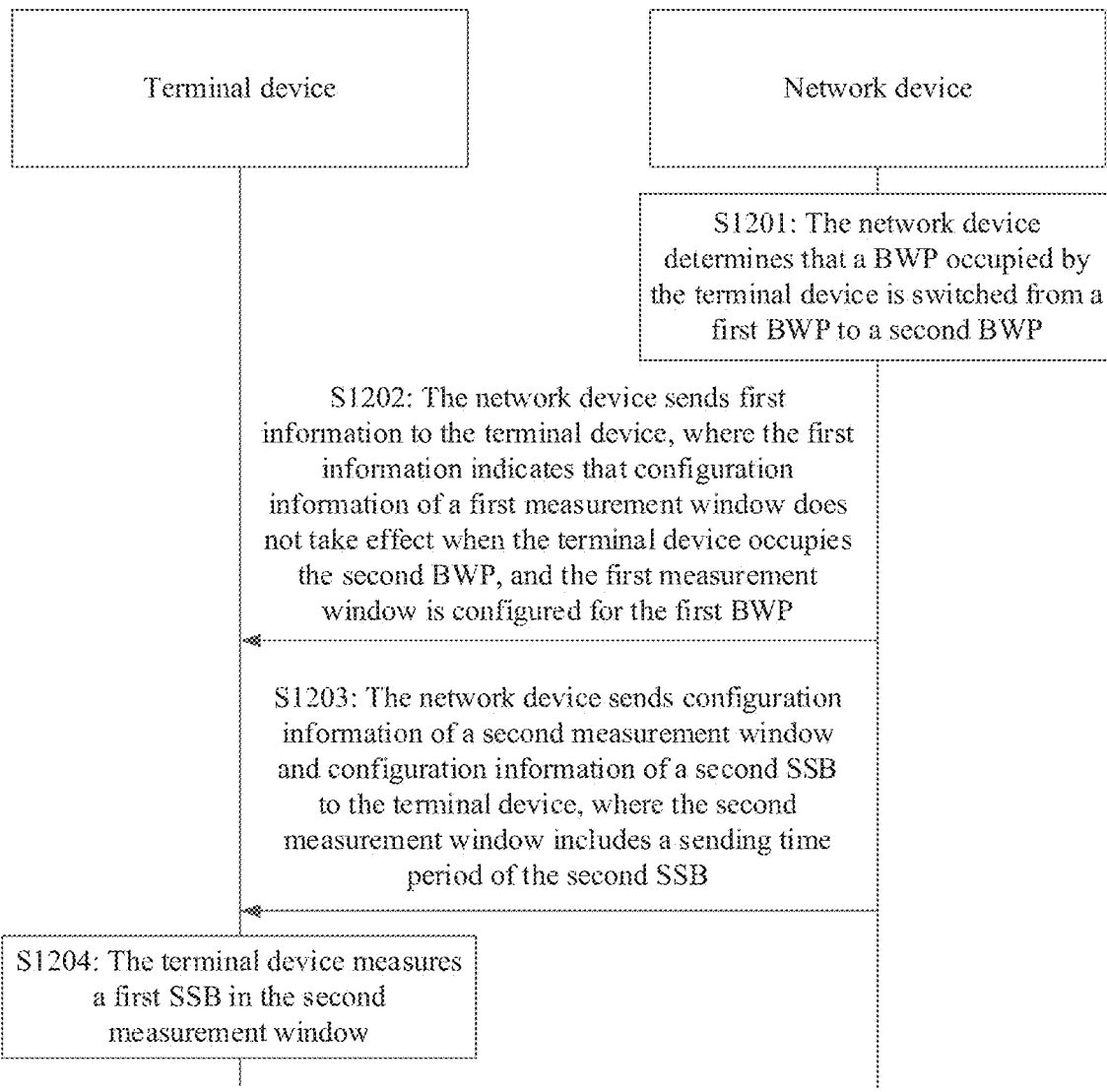
FIG. 12 is a seventh overview flowchart of a measurement configuration method according to this application.

Method 1:

FIG. 12 shows a measurement configuration method according to this application. The method includes the following steps.

S1201: A network device determines that a BWP occupied by a terminal device is switched from a first BWP to a second BWP.

For details, refer to the description in S501. Details are not described herein again.

S1202: The network device sends first information to the terminal device, where the first information indicates that configuration information of a first measurement window does not take effect when the terminal device occupies the second BWP, and the first measurement window is configured for the first BWP. Correspondingly, the terminal device receives the first information from the network device.

S1203: The network device sends configuration information of a second measurement window and configuration information of a second SSB to the terminal device, where the second measurement window includes a sending time period of the second SSB. Correspondingly, the terminal device receives the configuration information of the second measurement window from the network device.

Because the configuration information of the first measurement window does not take effect, and a frequency domain resource corresponding to the first BWP and a frequency domain resource corresponding to the second BWP do not simultaneously include a frequency domain resource corresponding to the first SSB, the network device may reconfigure a new measurement window and a new SSB, so as to ensure that the terminal device can measure the new SSB.

S1204: The terminal device measures the second SSB in the second measurement window.

The terminal device stops, in the second measurement window; signal receiving and sending in a serving cell, adjusts a radio frequency channel to a frequency of an inter-frequency or inter-RAT neighboring cell, and measures the second SSB.

In the foregoing method 1, the network device indicates that the configuration information of the first measurement window does not take effect, and anew measurement window and a new SSB are reconfigured, to ensure that the terminal device can measure the new SSB. For example, as shown in FIG. 7, the network device configures an SSB of an inter-frequency or inter-RAF neighboring cell that needs to be measured by the terminal device as an SSB 1. The network device configures four BWPs for the terminal device. When the BWP occupied by the terminal device is switched from an initial BWP to a BWP 2, the frequency domain resource corresponding to the BWP 2 does not include a frequency domain resource of the SSB 1, but includes the frequency domain resource of the SSB 1. The network device updates and configures the SSB of the inter-frequency or inter-RAT neighboring cell that needs to be measured by the terminal device as an SSB 2, and the network device may configure a new measurement window, where the new measurement window includes a sending time period of the SSB 2, so that the terminal device measures the SSB 2 in the new measurement window. Similarly, this method may be applicable to switching from the BWP 2 to the initial BWP.

Figure 13:
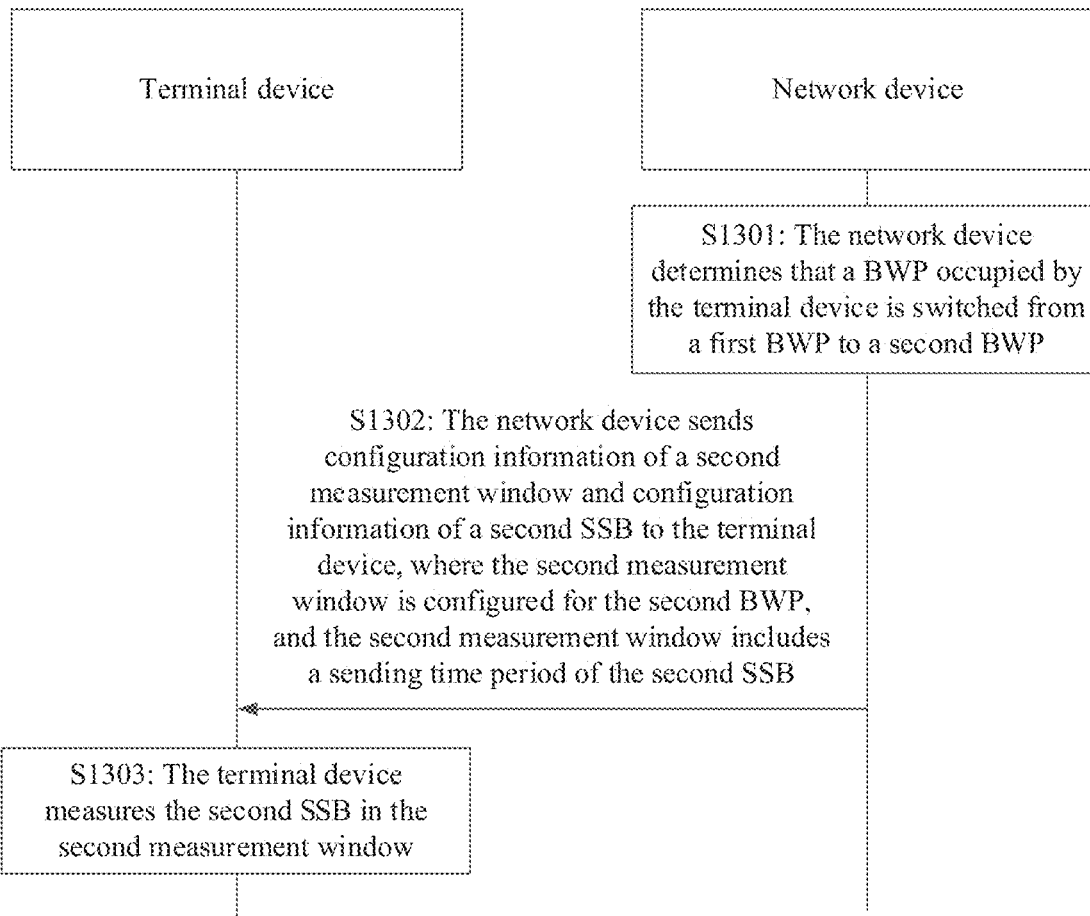
FIG. 13 is an eighth overview flowchart of a measurement configuration method according to this application.

Method 2:

FIG. 13 shows a measurement configuration method according to this application. The method includes the following steps.

S1301: A network device determines that a BWP occupied by a terminal device is switched from a first BWP to a second BWP.

For details, refer to the description in S501. Details are not described herein again.

S1302: The network device sends configuration information of a second measurement window and configuration information of a second SSB to the terminal device, where the second measurement window is configured for the second BWP, and the second measurement window includes a sending time period of the second SSB. Correspondingly, the terminal device receives the configuration information of the second measurement window from the network device.

S1303: The terminal device measures the second SSB in the second measurement window.

In the foregoing method 2, the network device directly configures a new measurement window and a new SSB, to ensure that the terminal device can measure the new SSB. For example, as shown in FIG. 7, the network device configures an SSB of an inter-frequency or inter-RAT neighboring cell that needs to be measured by the terminal device as an SSB 1. The network device configures four BWPs for the terminal device. When the BWP occupied by the terminal device is switched from an initial BWP to a BWP 2, the frequency domain resource corresponding to the BWP 2 does not include a frequency domain resource of the SSB 1, but includes the frequency domain resource of the SSB 1. The network device updates and configures the SSB of the inter-frequency or inter-RAT neighboring cell that needs to be measured by the terminal device as an SSB 2, and the network device may configure a new measurement window, where the new measurement window includes a sending time period of the SSB 2, so that the terminal device measures the SSB 2 in the new measurement window. Similarly, this method may be applicable to switching from the BWP 2 to the initial BWP.

Further, for the scenario 4, if the terminal device further supports the measurement window-free measurement manner, the network device may not need to reconfigure the measurement window, that is, do not send the configuration information of the second measurement window, or the configuration information of the second measurement window is empty. However, the network device updates and configures the SSB of the inter-frequency or inter-RAT neighboring cell that needs to be measured by the terminal device as the second SSB. The terminal device measures the second SSB in the measurement window-free measurement manner.

It should be understood that, for the foregoing case in which reconfiguration needs to be performed, the case may include but is not limited to the following scenario.

In a possible scenario, there is an SSB on the BWP before the switching, and a measurement window is configured for the BWP before the switching. Jitter of the measurement window may occur in a BWP switching process. Therefore, the SSB may not be accurately measured, Therefore, the measurement window needs to be reconfigured, to ensure accurate SSB measurement. In another possible scenario, there is an SSB on the BWP before the switching. If no measurement window is configured for the BWP before the switching, for example, the terminal device supports a measurement window-free measurement manner, if there is no SSB on the BWP after the switching, after the BWP is switched, a measurement window must be configured to ensure accurate SSB measurement.

In the foregoing embodiments provided in this application, various solutions of the communication method provided in the embodiments of this application are separately described from perspectives of each network element and interaction between the network elements. It may be understood that, to implement the foregoing functions, each network element such as the network device or the terminal device includes a corresponding hardware structure and/or software module for performing each function. Persons skilled in the art may be easily aware that, units and algorithm steps of each example described in combination with the embodiments disclosed in the specification may be implemented by hardware, or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 14:
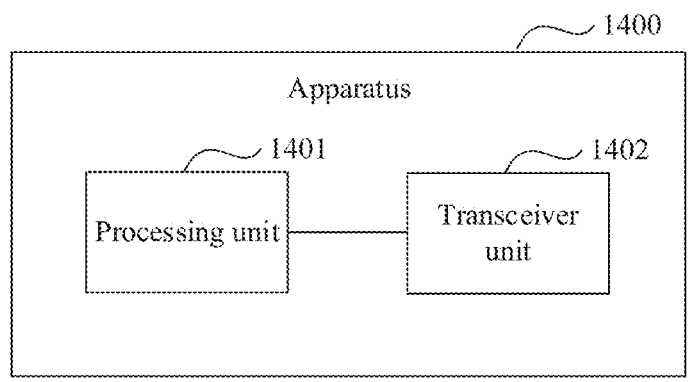
FIG. 14 is a first schematic diagram of a structure of an apparatus according to this application.

Same as the foregoing idea, as shown in FIG. 14, an embodiment of this application further provides an apparatus 1400. The apparatus 1400 includes a transceiver unit 1402 and a processing unit 1401.

In an example, the apparatus 1400 is configured to implement functions of the terminal device in the foregoing methods. The apparatus may be a terminal device, or may be an apparatus in a terminal device, for example, a chip system.

The processing unit 1401 determines that a BWP occupied by the terminal device is switched from a first BWP to a second BWP.

The transceiver unit 1402 receives configuration information of a second measurement window from a network device, where the second measurement window is configured for the second BWP.

For example, the apparatus 1400 is configured to implement a function of the first communications device in the foregoing method. The apparatus may be a terminal device, or may be an apparatus in a terminal device, for example, a chip system.

The processing unit 1401 determines that a BWP occupied by the terminal device is switched from a first BWP to a second BWP.

The transceiver unit 1402 receives first information from the network device, where the first information indicates whether configuration information of a first measurement window takes effect when the terminal device occupies the second BWP, and the first measurement window is configured for the first BWP.

In an example, the apparatus 1400 is configured to implement a function of the network device in the foregoing method. The apparatus may be a network device, or may be an apparatus in a network device.

The processing unit 1401 determines that a BWP occupied by the terminal device is switched from a first BWP to a second BWP.

The transceiver unit 1402 sends first information to the terminal device, where the first information indicates whether configuration information of a first measurement window takes effect when the terminal device occupies the second BWP, and the first measurement window is configured for the first BWP.

In an example, the apparatus 1400 is configured to implement a function of the network device in the foregoing method. The apparatus may be a network device, or may be an apparatus in a network device.

The processing unit 1401 determines that a BWP occupied by the terminal device is switched from a first BWP to a second BWP.

The transceiver unit 1402 sends configuration information of a second measurement window to the terminal device, where the second measurement window is configured for the second BWP.

For specific execution processes of the processing unit 1401 and the transceiver unit 1402, refer to the descriptions in the foregoing method embodiments. Division into modules in embodiments of this application is an example, and is merely logical function division. During actual implementation, there may be another division manner. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

In another optional variation, the apparatus may be a chip system. In this embodiment of this application, the chip system may include a chip, or may include a chip and another discrete device. For example, the apparatus includes a processor and an interface, and the interface may be an input/output interface. The processor implements functions of the processing unit 1401, and the interface implements functions of the transceiver unit 1402. The apparatus may further include a memory. The memory is configured to store a program that can be run on a processor. When the processor executes the program, the methods in the foregoing embodiments are performed.

Figure 15:
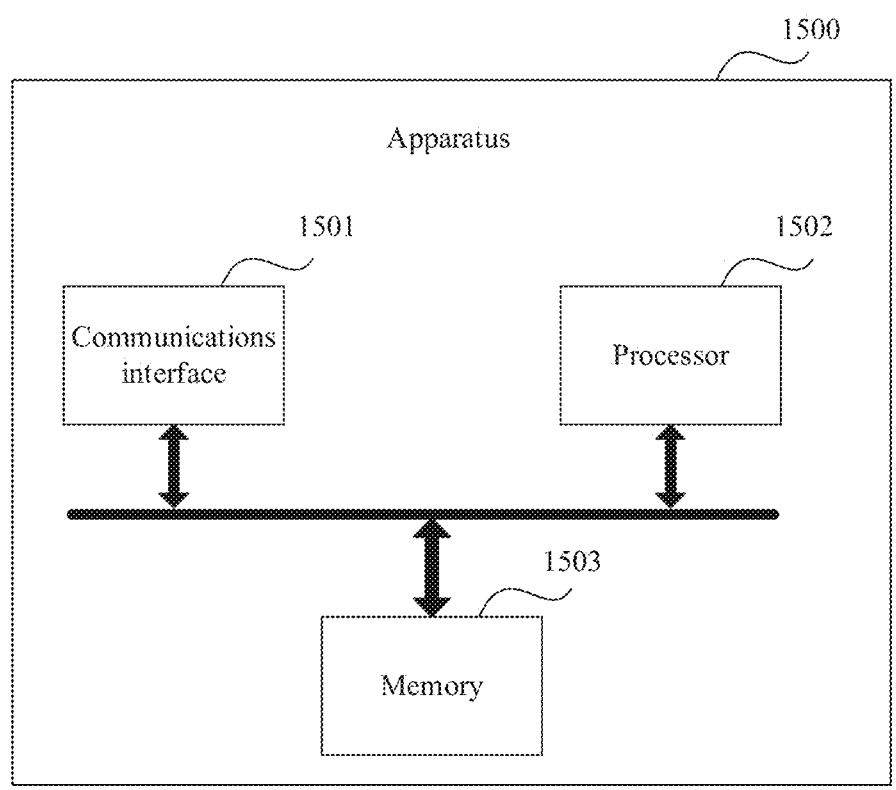
FIG. 15 is a second schematic diagram of a structure of an apparatus according to this application.

Same as the foregoing idea, as shown in FIG. 15, an embodiment of this application further provides an apparatus 1500. The apparatus 1500 includes a communications interface 1501, at least one processor 1502, and at least one memory 1503. The communications interface 1501 is configured to communicate with another device by using a transmission medium, so that an apparatus in the apparatus 1500 can communicate with the another device. The memory 1503 is configured to store a computer program. The processor 1502 invokes the computer program stored in the memory 1503, to send and receive data by using the communications interface 1501, to implement the method in the foregoing embodiments.

For example, when the apparatus is a network device, the memory 1503 is configured to store a computer program. The processor 1502 invokes the computer program stored in the memory 1503, and performs, through the communications interface 1501, the methods performed by the network device in the foregoing embodiments. When the apparatus is a first terminal device, the memory 1503 is configured to store a computer program. The processor 1502 invokes the computer program stored in the memory 1503, to perform, through the communications interface 1501, the methods performed by the terminal device in the foregoing embodiments.

In this embodiment of this application, the communications interface 1501 may be a transceiver, a circuit, a bus, a module, or a communications interface of another type. The processor 1502 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to embodiments of this application may be directly performed and completed by a hardware processor, or may be performed and, completed by a combination of hardware in the processor and a software module. The memory 1503 may be a nonvolatile memory, for example, a hard disk (hard disk drive, HDD) or a solid-state drive (solid-state drive, SSD), or may be a volatile memory (volatile memory), for example, a random-access memory (random-access memory, RAM). The memory is any other medium that can be used to carry or store desired program code in a form of an instruction or a data structure and that can be accessed by a computer, but is not limited thereto. The memory in this embodiment of this application may alternatively be a circuit or any other apparatus that can implement a storage function. The memory 1503 is coupled to the processor 1502. Coupling in this embodiment of this application may be indirect coupling or a communication connection between apparatuses, units, or modules in an electrical form a mechanical form, or another form, and is used for information exchange between the apparatuses, the units, or the modules. In another implementation, the memory 1503 may alternatively be located outside the apparatus 1500. The processor 1502 may operate in collaboration with the memory 1503. The processor 1502 may execute program instructions stored in the memory 1503. At least one of the at least one memory 1503 may alternatively be included in the processor 1502. In this embodiment of this application, a connection medium between the communications interface 1501, the processor 1502, and the memory 1503 is not limited. For example, in this embodiment of this application, the memory 1503, the processor 1502, and the communications interface 1501 may be connected through a bus in FIG. 15. The bus may be classified into an address bus, a data bus, a control bus, or the like.

It may be understood that the apparatus in the embodiment shown in FIG. 14 may be implemented by the apparatus 1500 shown in FIG. 15. Specifically, the processing unit 1401 may be implemented by the processor 1502, and the transceiver unit 1402 may be implemented by the communications interface 1501.

An embodiment of this application further provides a computer-readable storage medium. The computer-readable storage medium stores a computer program. When the computer program is run on a computer, the computer is enabled to perform the method according to the foregoing embodiments.

All or some of the methods provided in the embodiments of this application may be implemented by using software, hardware, firmware, or any combination thereof. When software is used to implement the embodiments, all or some of the embodiments may be implemented in a form of the computer program product. The computer program product includes one or more computer instructions. When the computer program instructions are loaded and executed on the computer, all or some of the procedures or functions according to the embodiments of the present invention are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL for short)) or wireless (for example, infrared, radio, or a microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (digital video disc, DVD for short)), a semiconductor medium (for example, a solid state disk Solid State Disk, SSD), or the like.

The foregoing embodiments are merely used to describe the technical solutions of this application in detail. The descriptions of the foregoing embodiments are merely intended to help understand the method of the embodiments of the present invention, and shall not be construed as a limitation on the embodiments of the present invention. Variations or replacements that may be easily conceived of by persons skilled in the art shall all fall within the protection scope of the present invention.

What is claimed is:

1. A method implemented by a terminal device, wherein the method comprises:
   determining that a first bandwidth part (BWP) occupied by the terminal device has switched to a second BWP; and
   receiving, from a network device, first information of a second measurement window or second configuration information of the second measurement window,
   wherein the first information indicates whether first configuration information of a first measurement window takes effect when the terminal device occupies the second BWP, whether the first measurement window is configured for the first BWP, and whether the second measurement window is configured for the second BWP.

2. The method of claim 1, wherein a first frequency domain resource corresponding to the first BWP comprises a second frequency domain resource corresponding to a synchronization signal block (SSB), wherein a third frequency domain resource corresponding to the second BWP comprises the second frequency domain resource, wherein the first information indicates that the first configuration information does not take effect,
   and wherein the method further comprises measuring the SSB in a measurement window-free measurement manner.

3. The method of claim 1, wherein a first frequency domain resource corresponding to the first BWP comprises a second frequency domain resource corresponding to a synchronization signal block (SSB), wherein a third frequency domain resource corresponding to the second BWP comprises the second frequency domain resource, wherein the terminal device does not support a measurement window-free measurement, wherein the first information indicates that the first configuration information takes effect,
   and wherein the method further comprises measuring the SSB in the first measurement window.

4. The method of claim 1, wherein either a first frequency domain resource corresponding to the first BWP comprises a second frequency domain resource corresponding to a synchronization signal block (SSB) and a third frequency domain resource corresponding to the second BWP does not comprise the second frequency domain resource or the third frequency domain resource comprises the second frequency domain resource and the first frequency domain resource does not comprise the second frequency domain resource, wherein the first information indicates that the first configuration information does not take effect from the network device, wherein the second measurement window comprises a sending time period of the SSB,
   and wherein the method further comprises measuring the SSB in the second measurement window.

5. The method of claim 1, wherein a first frequency domain resource corresponding to the first BWP comprises a second frequency domain resource corresponding to a first synchronization signal block (SSB), wherein a third frequency domain resource corresponding to the second BWP does not comprise the second frequency domain resource and comprises a fourth frequency domain resource corresponding to a second SSB, wherein the first information indicates that the first configuration information does not take effect, wherein the second measurement window comprises a sending time period of the second SSB,
   and wherein the method further comprises measuring the second SSB in the second measurement window.

6. The method of claim 1, wherein a first frequency domain resource corresponding to the first BWP comprises a second frequency domain resource corresponding to a first synchronization signal block (SSB), wherein a third frequency domain resource corresponding to the second BWP does not comprise the second frequency domain resource and comprises a fourth frequency domain resource corresponding to a second SSB, wherein the first information indicates that the first configuration information does not take effect,
   and wherein the method further comprises:
   receiving third configuration information of the second SSB; and
   measuring the second SSB in a measurement window-free measurement manner.

7. The method of claim 1, further comprising further receiving, from the network device, the first information in downlink control information (DCI).

8. The method of claim 1, wherein a first frequency domain resource corresponding to the first BWP comprises a second frequency domain resource corresponding to a synchronization signal block (SSB), wherein a third frequency domain resource corresponding to the second BWP comprises the second frequency domain resource, wherein the second configuration information is empty,
   and wherein the method further comprises: measuring the SSB in a measurement window-free measurement manner when the terminal device supports the measurement window-free measurement manner; and
   measuring the SSB in the first measurement window when the terminal device does not support the measurement window-free measurement manner.

9. The method of claim 1, wherein either a first frequency domain resource corresponding to the first BWP comprises a second frequency domain resource corresponding to a synchronization signal block (SSB) and a third frequency domain resource corresponding to the second BWP does not comprise the second frequency domain resource or the third frequency domain resource comprises the second frequency domain resource and the first frequency domain resource does not comprise second frequency domain resource configuration information, wherein the second measurement window comprises a sending time period of the SSB,
   and wherein the method further comprises measuring the SSB in the second measurement window.

10. The method of claim 1, wherein a first frequency domain resource corresponding to the first BWP comprises a second frequency domain resource corresponding to a first synchronization signal block (SSB), wherein a third frequency domain resource corresponding to the second BWP does not comprise the second frequency domain resource and comprises a fourth frequency domain resource corresponding to a second SSB, wherein the second configuration information comprises a sending time period of the second SSB, and wherein the method further comprises:
receiving, from the network device, third configuration information of the second SSB; and
measuring the second SSB in the second measurement window.

11. The method of claim 1, wherein a first frequency domain resource corresponding to the first BWP comprises a second frequency domain resource corresponding to a first synchronization signal block (SSB), wherein a third frequency domain resource corresponding to the second BWP does not comprise the second frequency domain resource and comprises a fourth frequency domain resource corresponding to a second SSB, wherein the second configuration information is empty,
and wherein the method further comprises:
receiving, from the network device, third configuration information of the second SSB; and
measuring the second SSB in a measurement window-free measurement manner.

12. A device comprising:
a memory configured to store program instructions; and
a processor coupled to the memory, wherein when executed by the processor, the program instructions cause the device to:
determine that a first bandwidth part (BWP) occupied by the device has switched to a second BWP; and
receive, from a network device, first information of a second measurement window or second configuration information of the second measurement window,
wherein the first information indicates whether first configuration information of a first measurement window takes effect when the device occupies the second BWP, whether the first measurement window is configured for the first BWP, and whether the second measurement window is configured for the second BWP.

13. The device of claim 12, wherein a first frequency domain resource corresponding to the first BWP comprises a second frequency domain resource corresponding to a synchronization signal block (SSB), wherein a third frequency domain resource corresponding to the second BWP comprises the second frequency domain resource wherein the first information indicates that the first configuration information does not take effect,
and wherein when executed by the processor, the program instructions further cause the device to measure the SSB in a measurement window-free measurement manner.

14. The device of claim 12, wherein a first frequency domain resource corresponding to the first BWP comprises a second frequency domain resource corresponding to a synchronization signal block (SSB), wherein a third frequency domain resource corresponding to the second BWP comprises the second frequency domain resource, wherein the device does not support measurement window-free measurement, wherein the first information indicates that the first configuration information takes effect,
and wherein when executed by the processor, the program instructions further cause the device to measure the SSB in the first measurement window.

15. The device of claim 12, wherein a first frequency domain resource corresponding to the first BWP comprises a second frequency domain resource corresponding to a synchronization signal block (SSB) and a third frequency domain resource corresponding to the second BWP does not comprise the second frequency domain resource or the third frequency domain resource comprises the second frequency domain resource and the first frequency domain resource does not comprise the second frequency domain resource, wherein the first information indicates that the first configuration information does not take effect, wherein the second measurement window comprises a sending time period of the SSB,
and wherein when executed by the processor, the program instructions further cause the device to measure the SSB in the second measurement window.

16. The device of claim 12, wherein a first frequency domain resource corresponding to the first BWP comprises a second frequency domain resource corresponding to a first synchronization signal block (SSB), wherein a third frequency domain resource corresponding to the second BWP does not comprise the second frequency domain resource and comprises a fourth frequency domain resource corresponding to a second SSB, wherein the first information indicates that the first configuration information does not take effect, wherein the second measurement window comprises a sending time period of the second SSB,
and wherein when executed by the processor, the program instructions further cause the device to measure the second SSB in the second measurement window.

17. The device of claim 12, wherein a first frequency domain resource corresponding to the first BWP comprises a second frequency domain resource corresponding to a first synchronization signal block (SSB), wherein a third frequency domain resource corresponding to the second BWP does not comprise the second frequency domain resource and comprises a fourth frequency domain resource corresponding to a second SSB, wherein the first information indicates that the first configuration information does not take effect, and wherein when executed by the processor, the program instructions further cause the device to:
receive, from the network device, third configuration information of the second SSB; and
measure the second SSB in a measurement window-free measurement manner.

18. The device of claim 12, wherein when executed by the processor, the program instructions further cause the device to further receive, from the network device, the first information in downlink control information (DCI).

19. A method implemented by a network device, wherein the method comprises:
making a determination that a first bandwidth part (BWP) occupied by a terminal device has switched a second BWP; and
sending, to the terminal device in response to the determination, first information of a second measurement window or second configuration information of the second measurement window,
wherein the first information indicates whether first configuration information of a first measurement window takes effect when the terminal device occupies the second BWP, whether the first measurement window is configured for the first BWP, and whether the second measurement window is configured for the second BWP.

20. The method of claim 19, wherein a first frequency domain resource corresponding to the first BWP comprises a second frequency domain resource corresponding to a synchronization signal block (SSB), wherein a third frequency domain resource corresponding to the second BWP comprises the second frequency domain resource, and wherein the method further comprises further sending, to the terminal device, the first information indicating that the first configuration information does not take effect.

* * * * *